March 25, 1941.  C. E. MILLER  2,236,440
AUTOMATIC MULTIPLE SPINDLE MACHINE
Filed Feb. 4, 1938  17 Sheets-Sheet 1
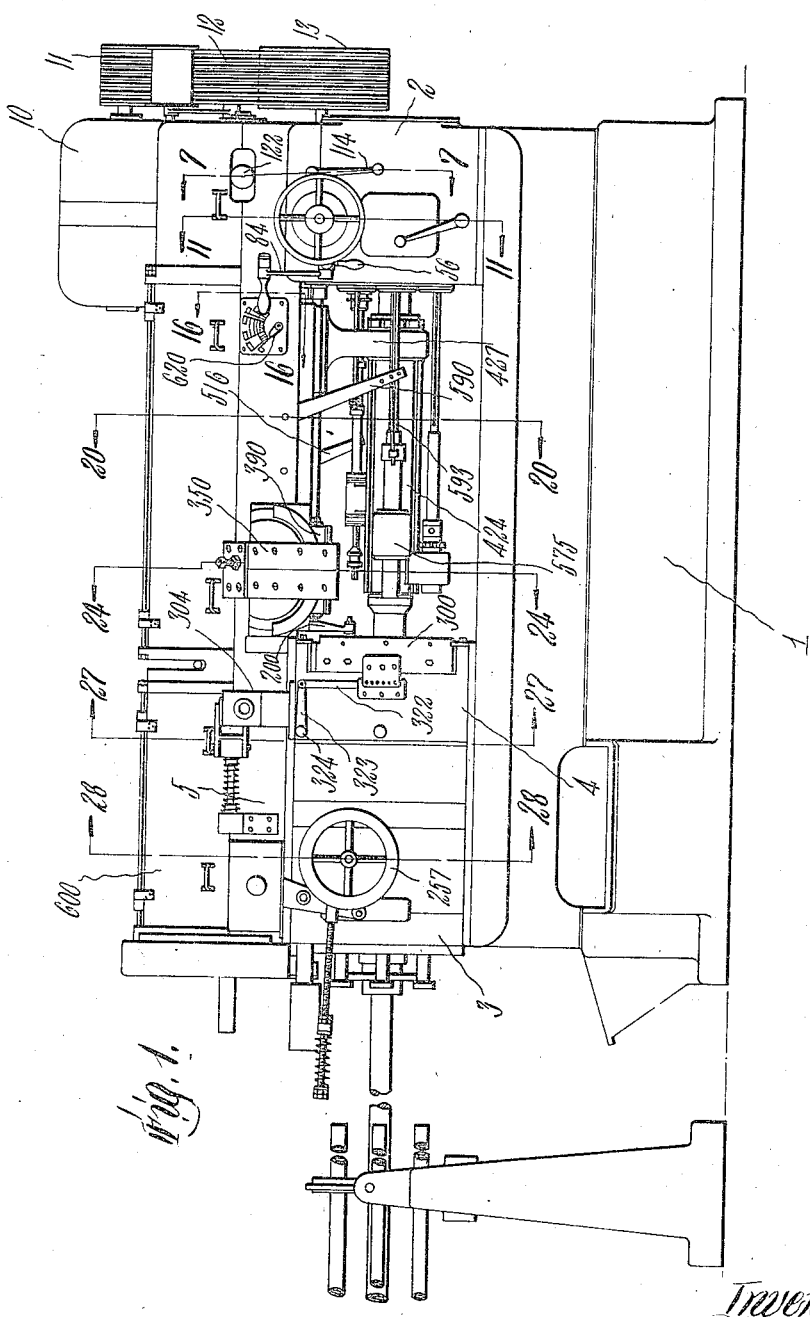
Inventor
by Carroll E. Miller
Wright, Brown, Quinby & May
Attys.

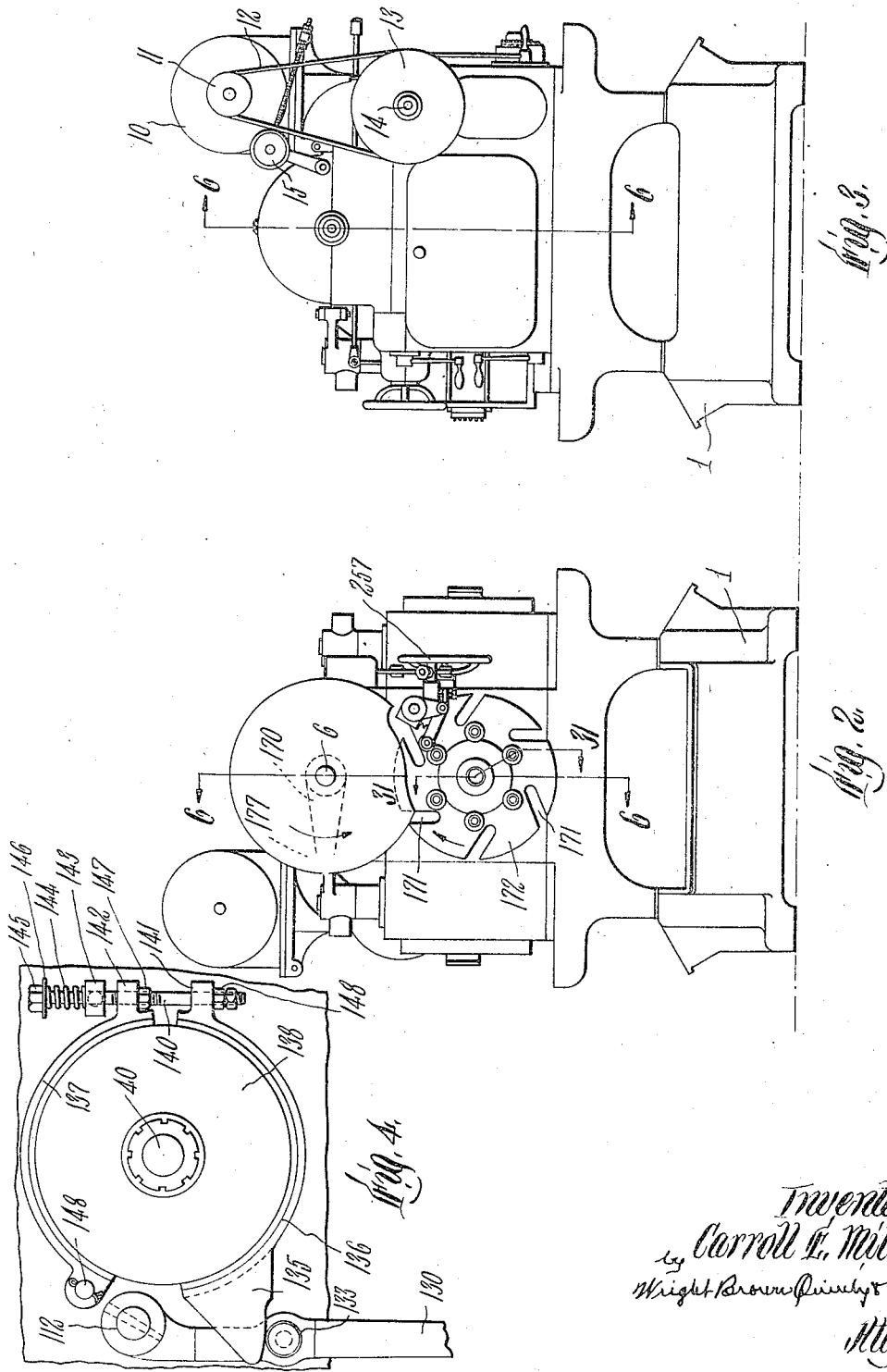

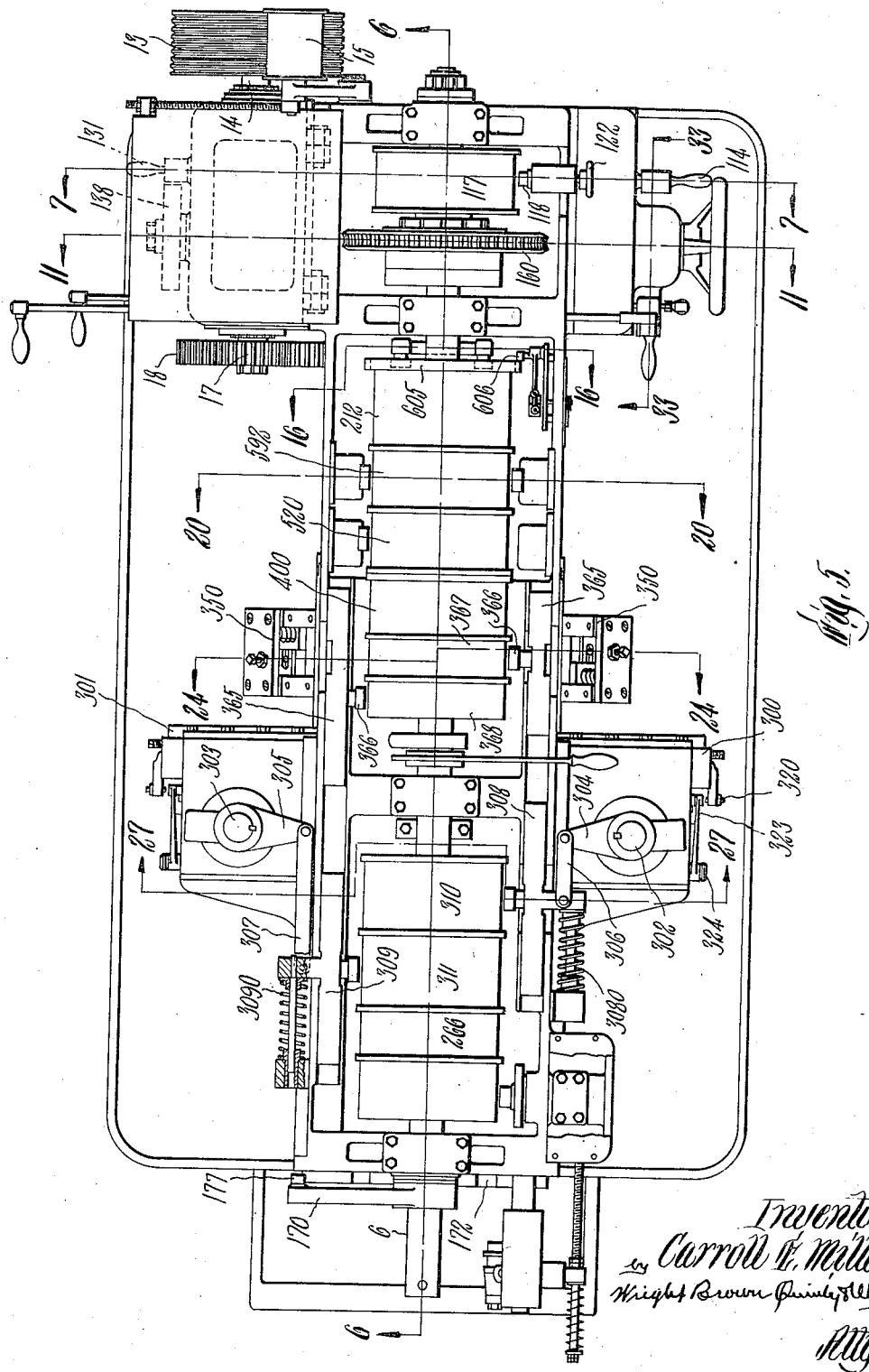

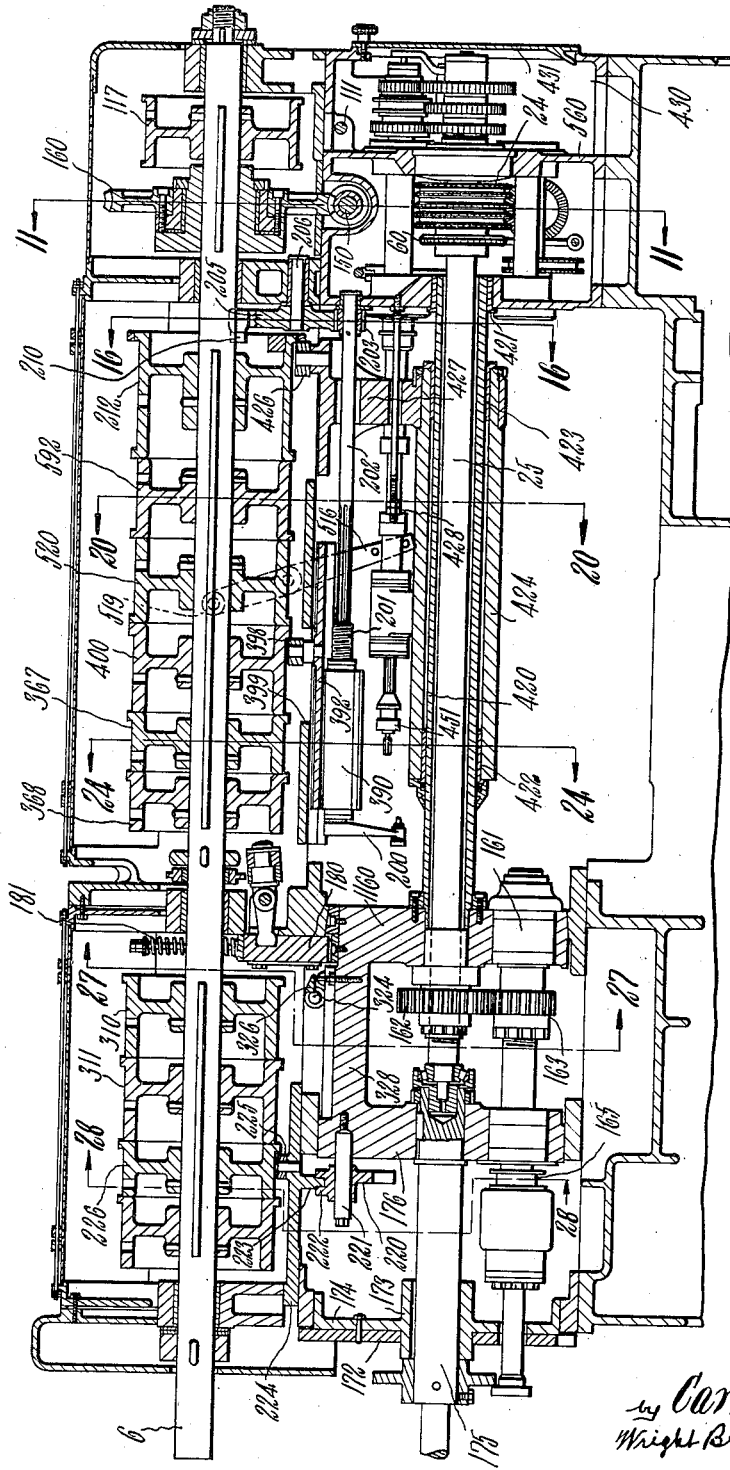

March 25, 1941.  C. E. MILLER  2,236,440
AUTOMATIC MULTIPLE SPINDLE MACHINE
Filed Feb. 4, 1938  17 Sheets-Sheet 5
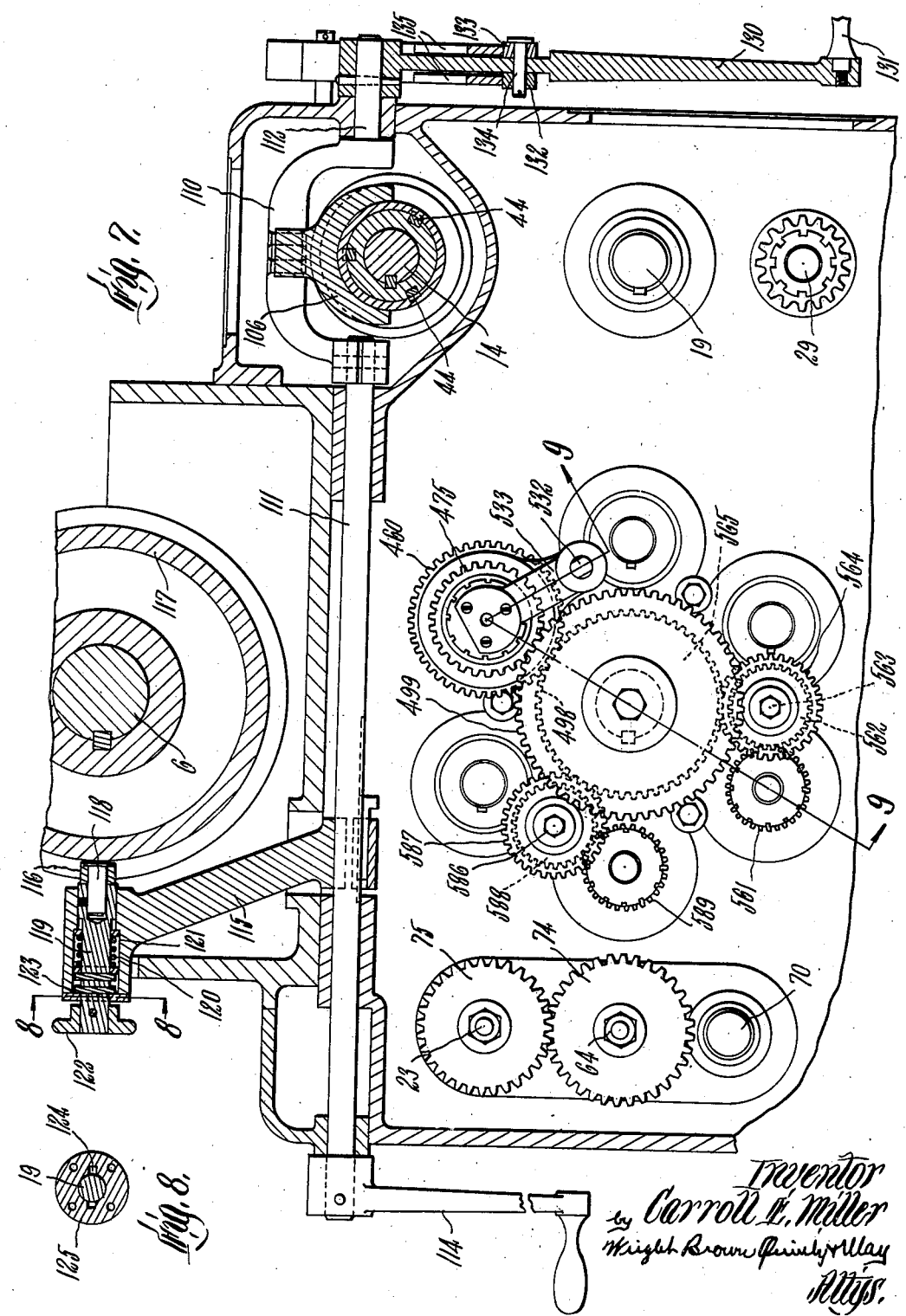

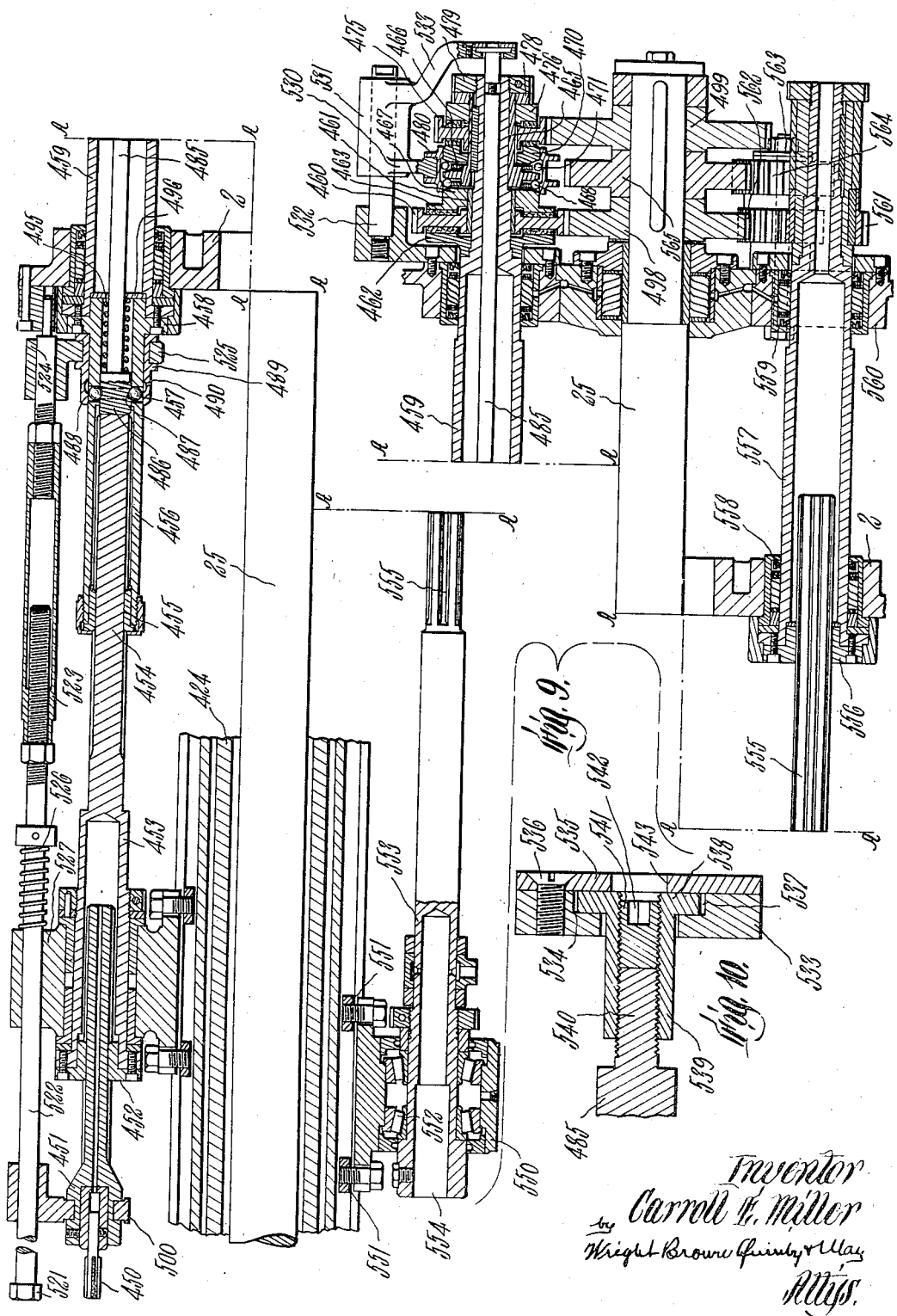

March 25, 1941. C. E. MILLER 2,236,440
AUTOMATIC MULTIPLE SPINDLE MACHINE
Filed Feb. 4, 1938 17 Sheets-Sheet 7
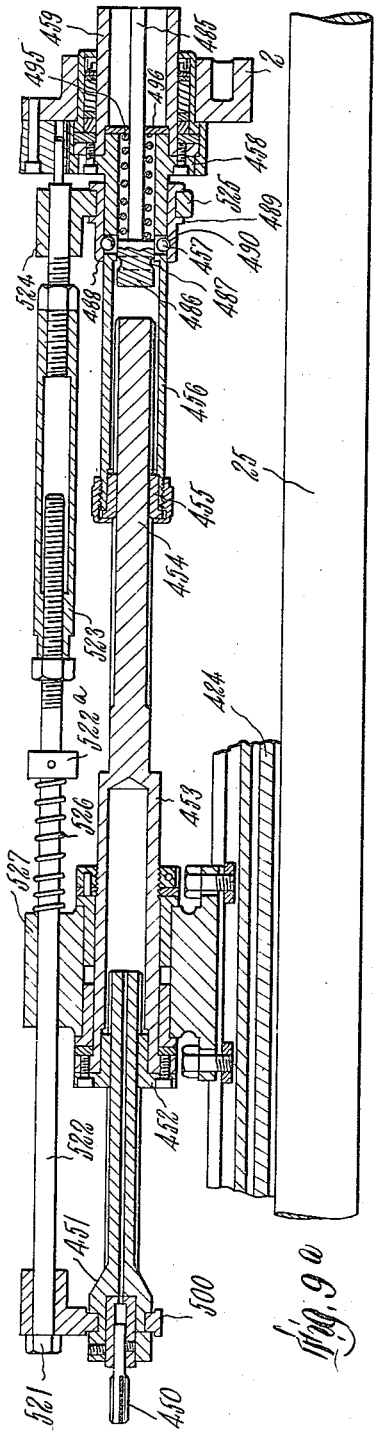
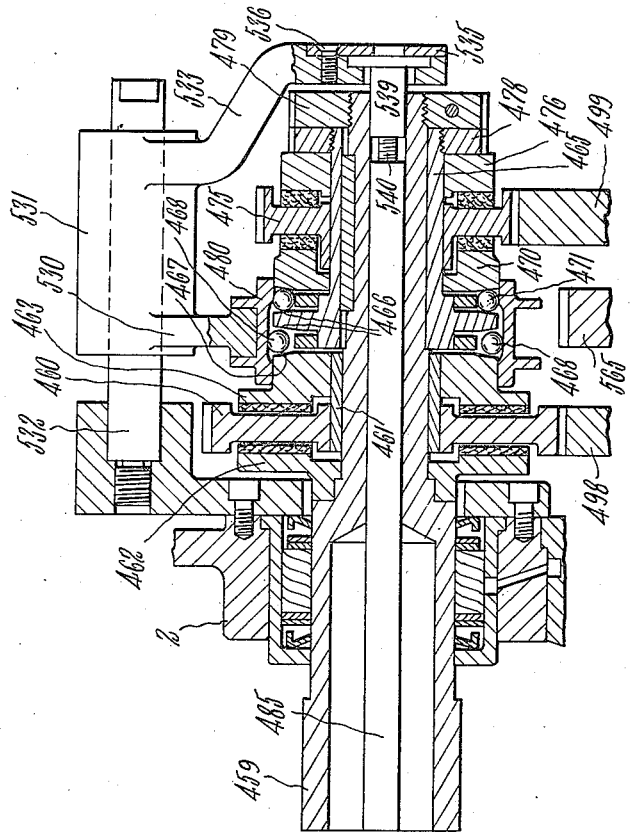
Inventor
Carroll E. Miller
by Wright Brown Quinby & May
Attys.

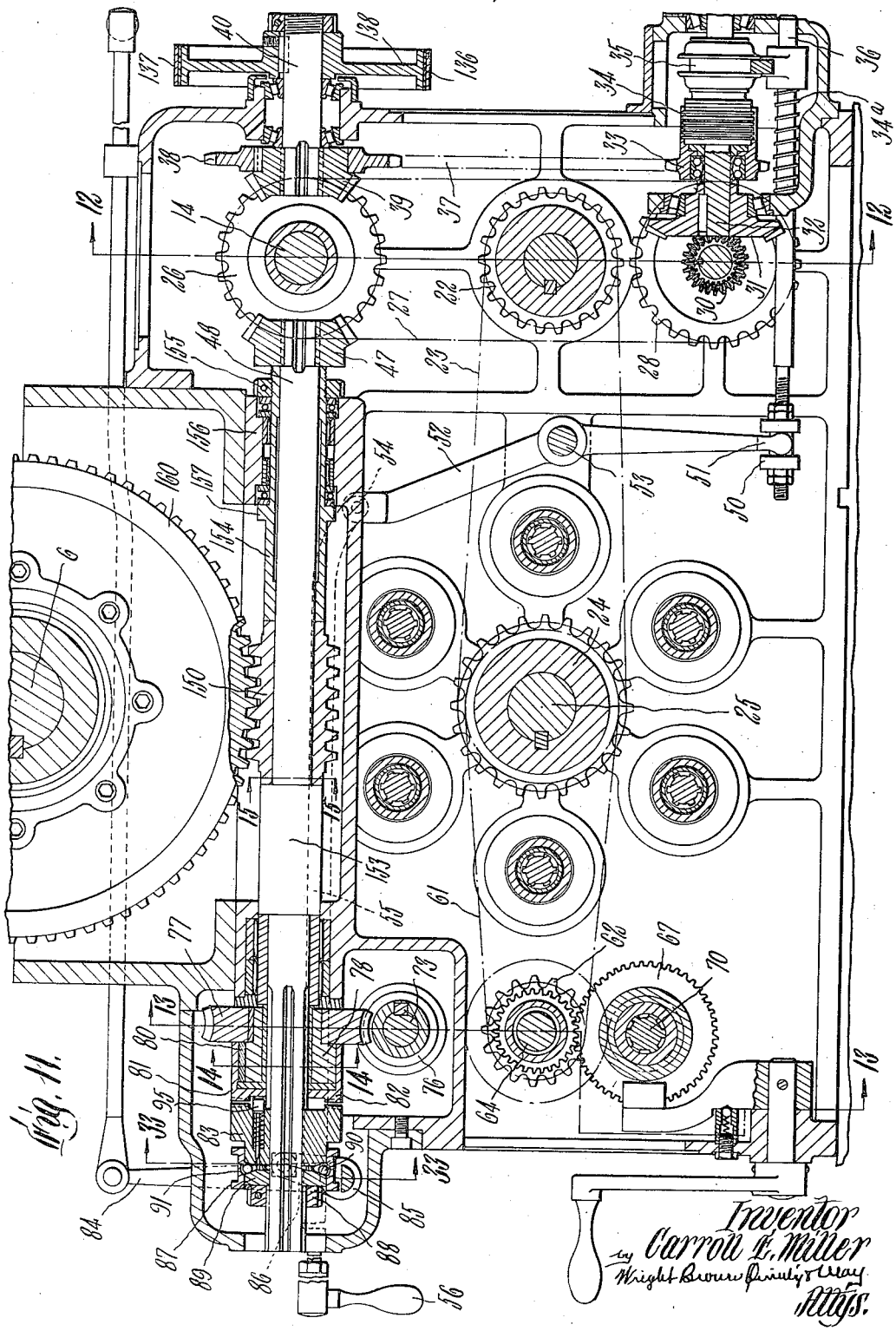

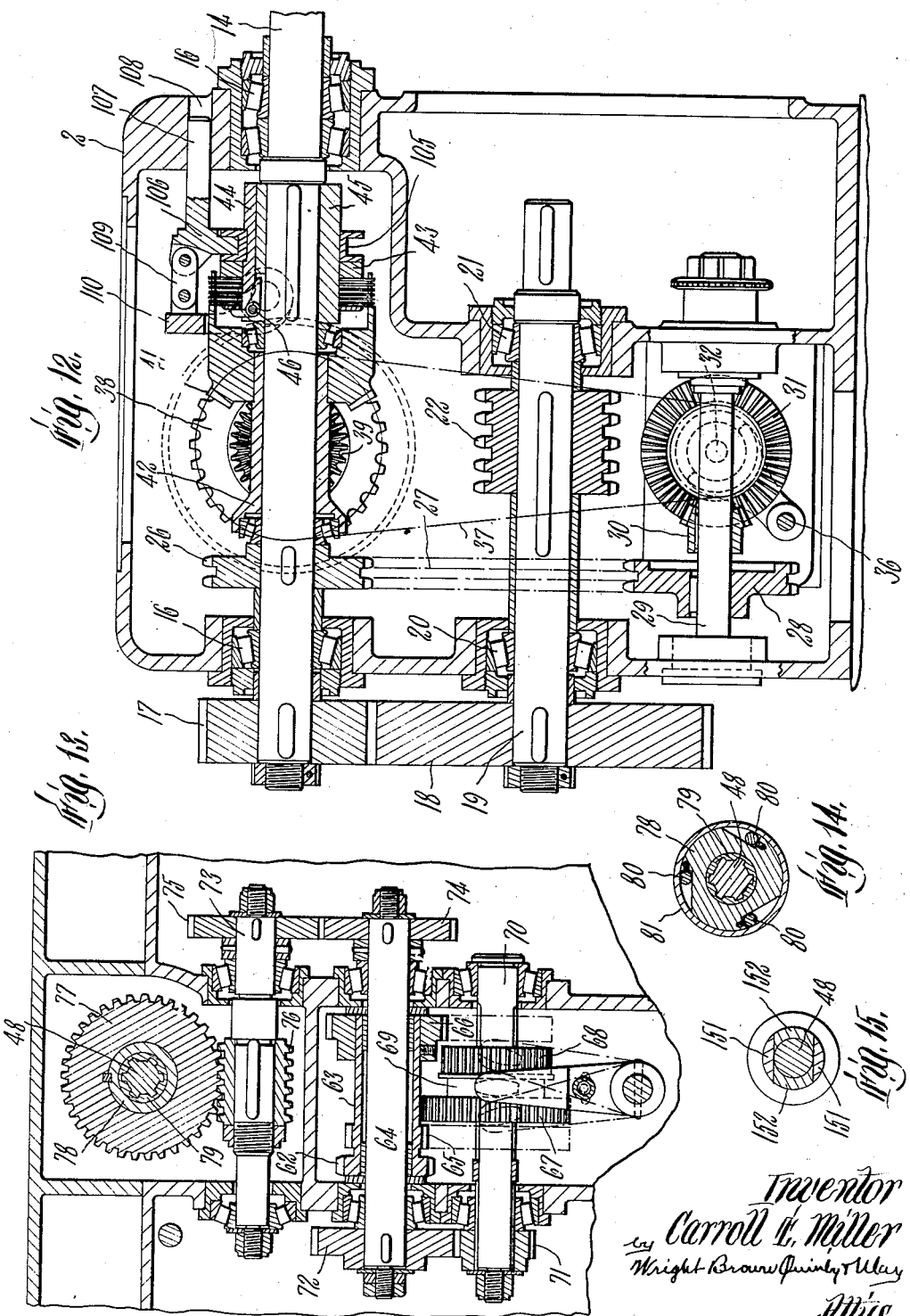

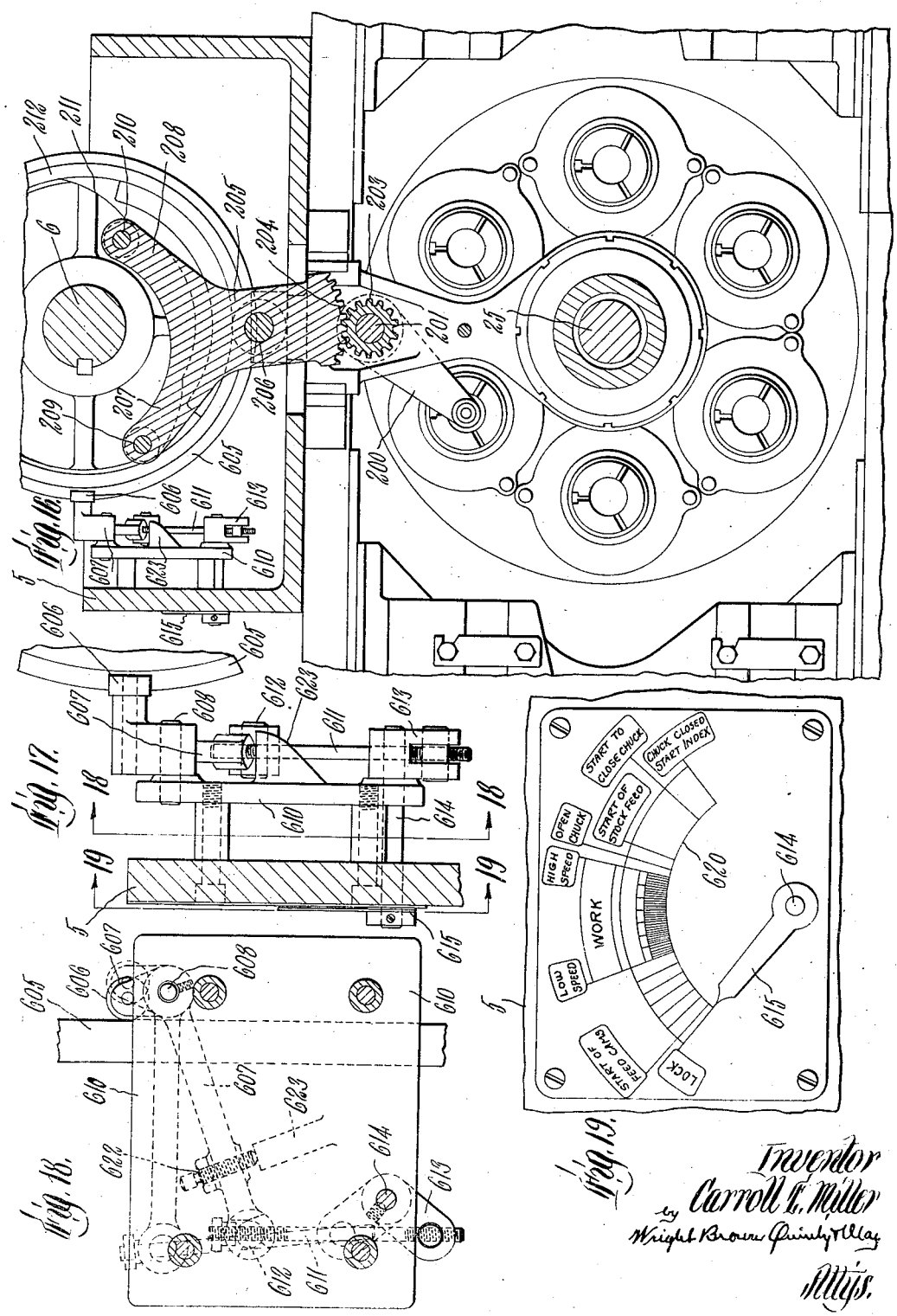

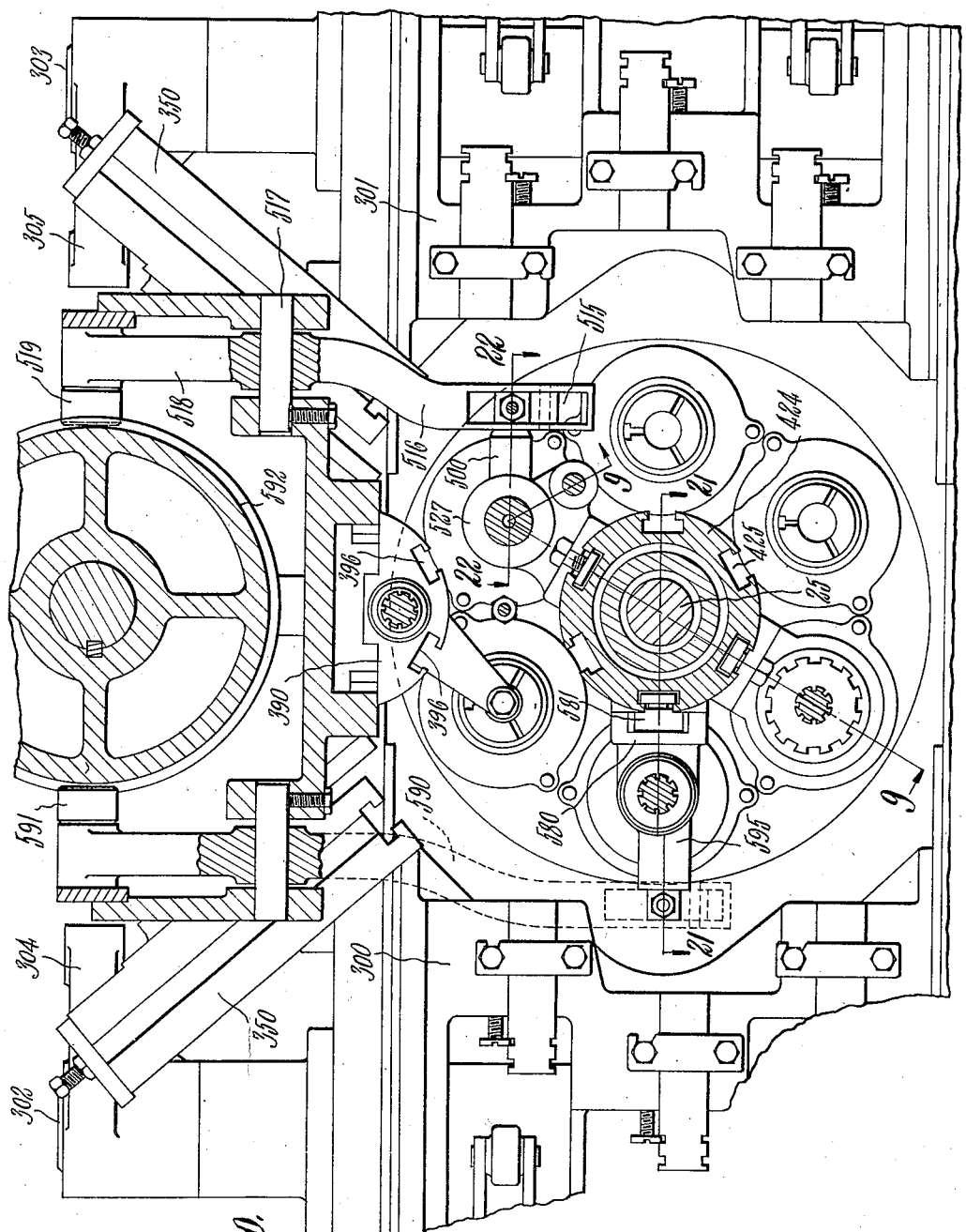

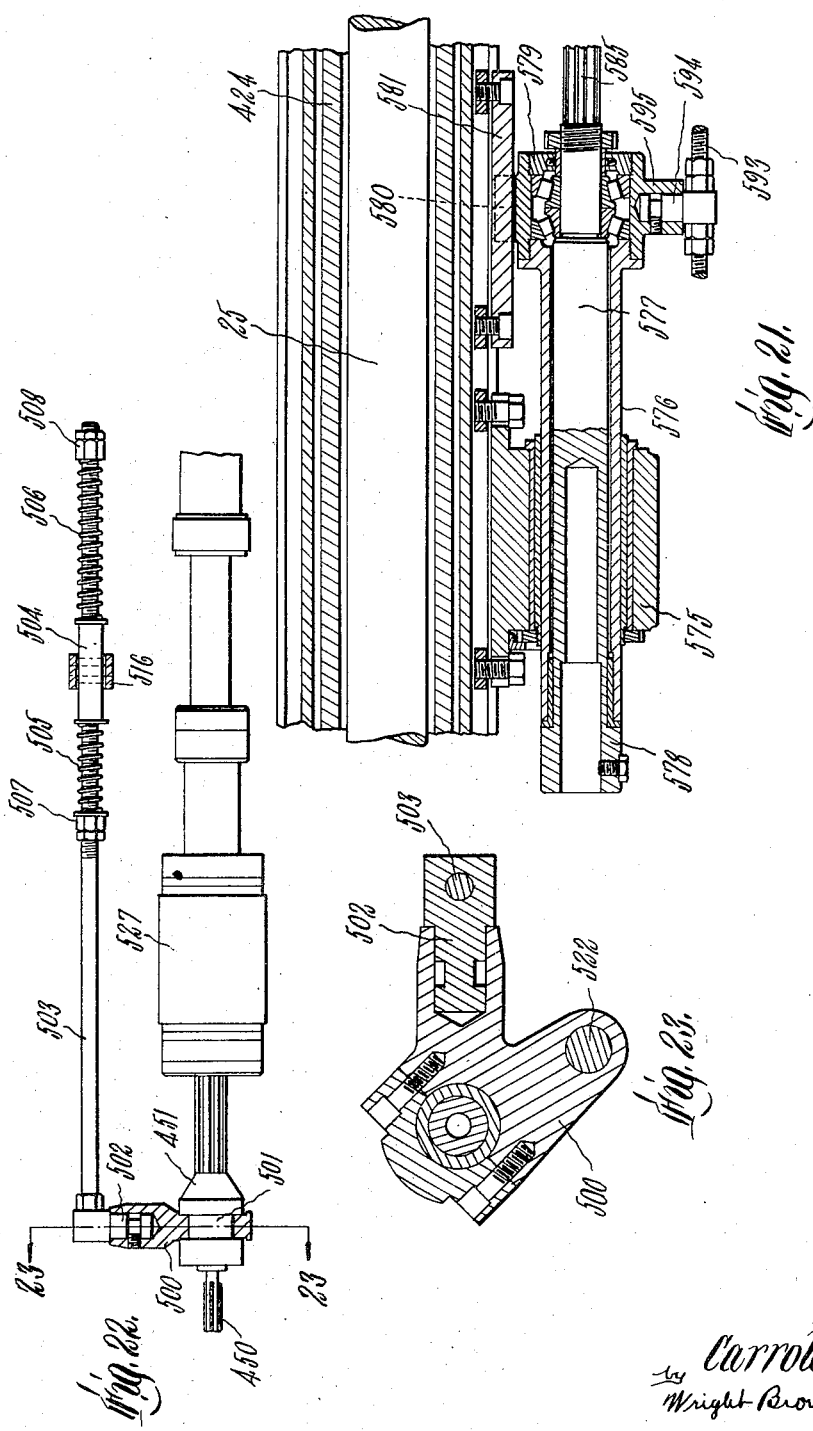

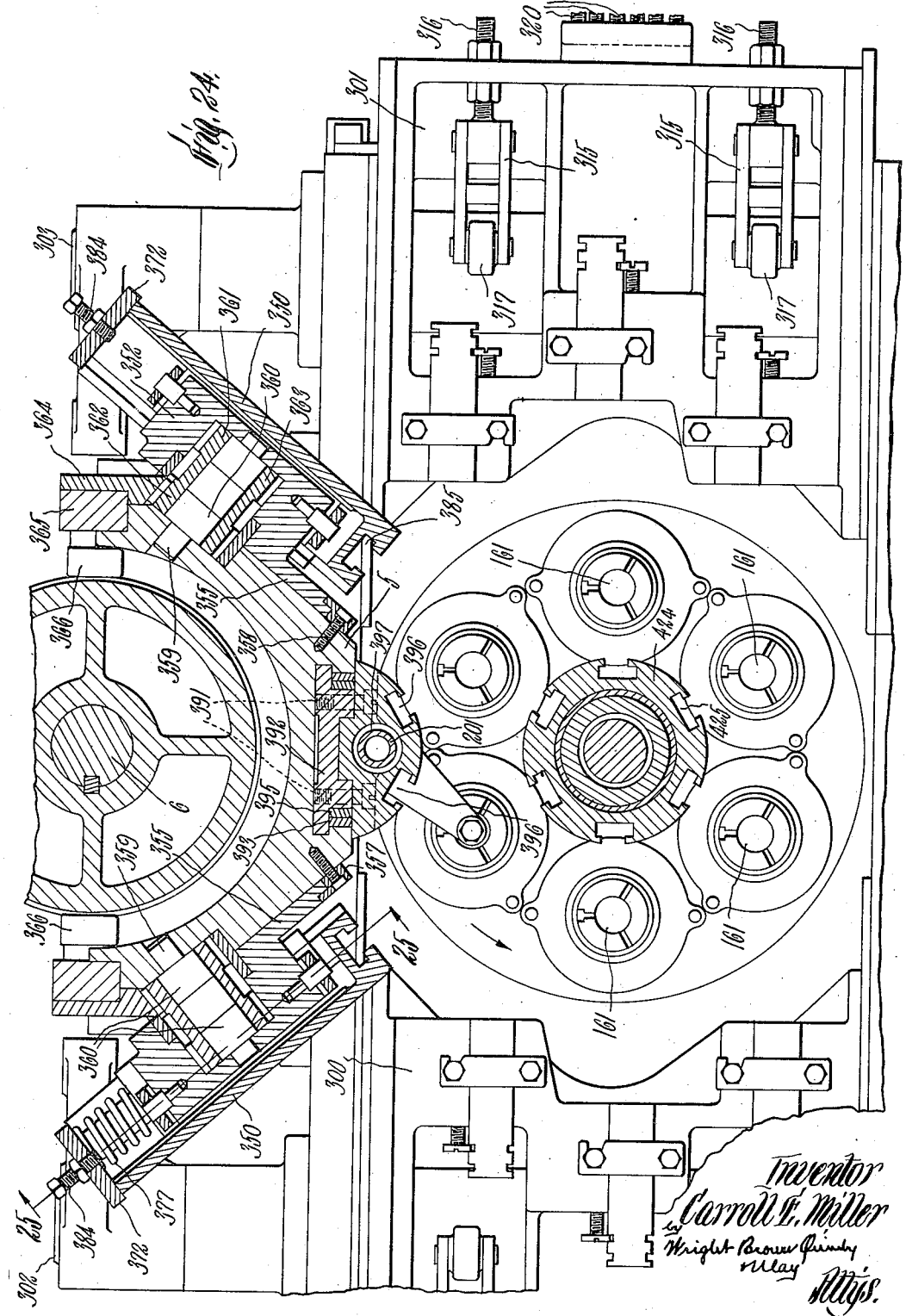

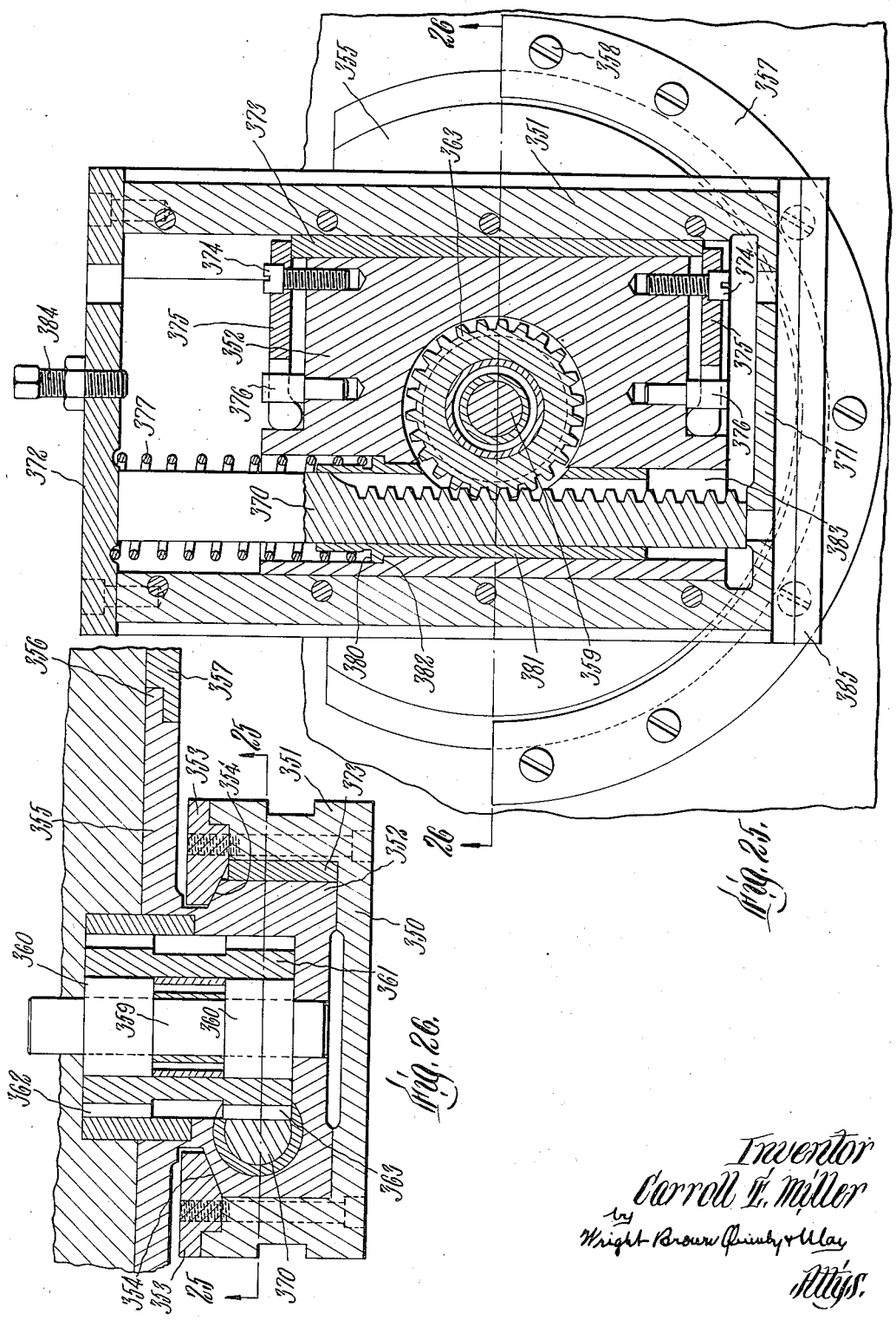

March 25, 1941.  C. E. MILLER  2,236,440
AUTOMATIC MULTIPLE SPINDLE MACHINE
Filed Feb. 4, 1938   17 Sheets-Sheet 15
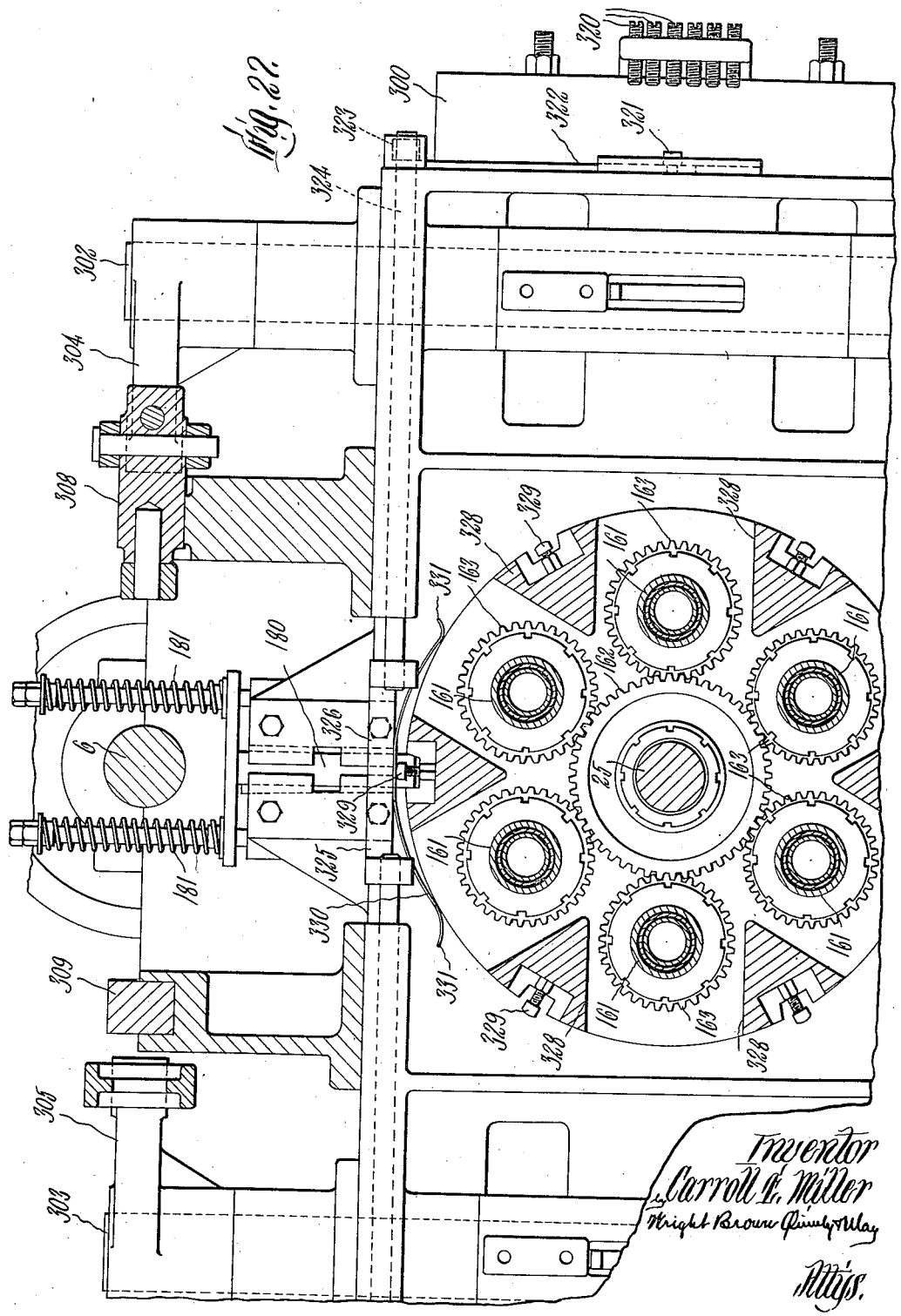

March 25, 1941.   C. E. MILLER   2,236,440
AUTOMATIC MULTIPLE SPINDLE MACHINE
Filed Feb. 4, 1938   17 Sheets-Sheet 16
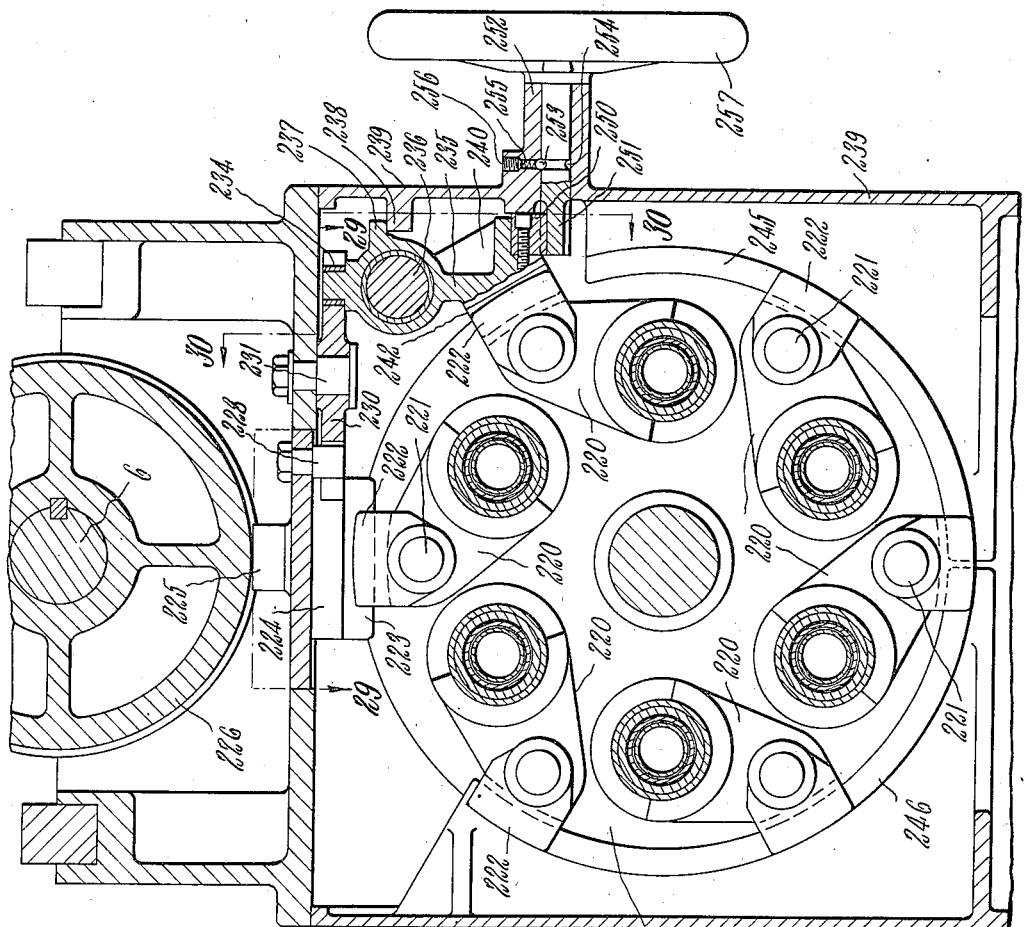
Inventor
Carroll E. Miller
by Wright Brown Quinby & May
Attys.

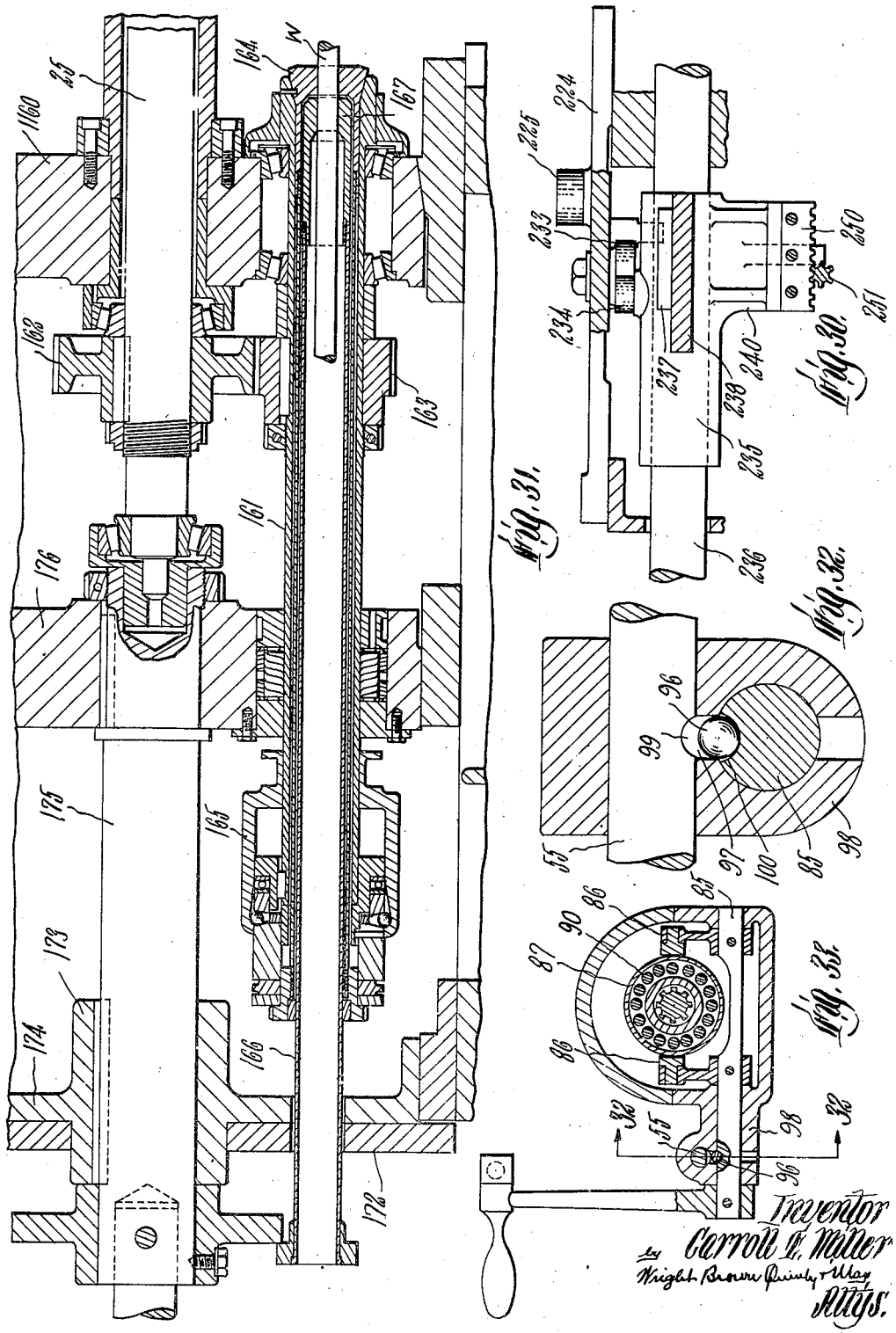

Patented Mar. 25, 1941

2,236,440

UNITED STATES PATENT OFFICE 2,236,440

AUTOMATIC MULTIPLE SPINDLE MACHINE

Carroll E. Miller, Windsor, Vt., assignor to Cone Automatic Machine Company Inc., Windsor, Vt., a corporation of Vermont Application February 4, 1938, Serial No. 188,644

24 Claims. (Cl. 29—37)

This invention relates to multiple spindle automatic machines such as are employed for quantity production of articles from continuous lengths of stock.

One object of this invention is to provide such a machine wherein all change gears and the driving mechanism for end working tools, such, for example, as drills, taps, counter bores and dies shall be readily accessible to the operator.

A further object is to provide a selective throw-out for the automatic control of high and low speeds, this facilitating hand turning over or control in setting up or adjusting the machine.

Still another object is to provide an indication of the position in the machine cycle that the machine is in at any time. In view of the compactness of the machine and the fact that it is desirable to enclose the working parts to prevent splashing of coolant and cuttings, the determination of the exact part of the cycle in which the machine is working at any instant has heretofore been difficult, if not impossible.

Another object is to provide a positive control of the stock stop.

A further object is to provide improved angular tool slides and actuating means therefor.

Another object is to provide an improved indexing mechanism by which the part to be turned reaches its indexed position quietly and without shock or jar.

Still another object is to provide improved mechanism for actuating the tool slide positive stops.

A further object is to insure the closing of a chuck before the tools can operate on the work carried thereby and by which the chuck of one spindle can be closed by the opening of a chuck of the succeeding spindle in the indexing cycle.

Still another object is to provide an improved threading attachment for rotary work spindle machines.

Further objects and advantageous arrangements of parts will appear from a more complete description of certain embodiments of the invention disclosed in the accompanying drawings in which—

Figure 1 is a front elevation of the machine.

Figures 2 and 3 are right and left end elevations, respectively, of the same.

Figure 4 is a fragmentary rear elevation of the machine showing the cam shaft drive brake mechanism.

Figure 5 is a top plan of the machine to a larger scale.

Figure 6 is a central vertical section to a larger scale on line 6—6 of Figures 2, 3 and 5.

Figure 7 is a section to a larger scale on line 7—7 of Figures 1 and 5.

Figures 8 and 9 are detail sections on lines 8—8 and 9—9, respectively, of Figure 7, and Figure 9 is also a section on line 9—9 of Figure 20.

Figures 9a and 9b together are views similar to Figure 9, but with the parts in different positions, and Figure 9b being drawn to a larger scale.

Figure 10 is a portion of Figure 9 to a larger scale.

Figure 11 is a section to a larger scale on line 11—11 of Figures 1, 5 and 6.

Figures 12 to 15, inclusive, are detail sections on the correspondingly numbered section lines of Figure 11.

Figure 16 is a section to a larger scale on line 16—16 of Figures 1, 5 and 6.

Figure 17 is a portion of Figure 16 to a larger scale.

Figures 18 and 19 are detail sections on lines 18—18 and 19—19 of Figure 17.

Figure 20 is a section to a larger scale on line 20—20 of Figures 1, 5 and 6.

Figures 21 and 22 are detail sections on lines 21—21 and 22—22, respectively, of Figure 20.

Figure 23 is a detail section to a larger scale on lines 23—23 of Figure 22.

Figure 24 is a section to a larger scale on line 24—24 of Figures 1, 5 and 6.

Figure 25 is a section to a larger scale on line 25—25 of Figures 24 and 26.

Figure 26 is a detail section on line 26—26 of Figure 25.

Figure 27 is a section to a larger scale on line 27—27 of Figures 1, 5 and 6.

Figure 28 is a section to a larger scale on line 28—28 of Figures 1 and 6.

Figures 29 and 30 are detail sections on lines 29—29 and 30—30, respectively, of Figure 28.

Figure 31 is a section to a larger scale on line 31—31 of Figure 2.

Figure 32 is a detail section to a larger scale on line 32—32 of Figure 33.

Figure 33 is a section on line 33—33 of Figures 5 and 11.

This machine is of the well known cone type having a bed 1; a column 2 at one end which houses the drive mechanism, a pair of supports 3 and 4 spaced from the column, the support 4 housing a horizontal turret, and a top bed or frame 5 bridging the column 2, and supports 3 and 4, and housing a cam shaft 6, which contains the various cams for controlling the various operations of the machine.

Drive mechanism

This mechanism is for the most part housed within the column 2 and includes the drive for the main work-carrying spindles, the auxiliary end working tools, and the cam shaft drive. This mechanism is driven from the main motor 10 which has a drive pulley 11 thereon from which a series of belts 12 pass around a main drive pulley 13 on the drive shaft 14, an idler 15 applying suitable tension to the belts.

As shown in Figures 7, 11 and 12, the shaft 14 extends through the column 2 wherein it is journaled as in the bearings 16. The shaft 14 on the opposite side of the column 2 from the drive pulley 13, has one of a pair of change gears 17 thereon meshing with a mating gear 18 keyed to a shaft 19 arranged parallel to and beneath the drive shaft 14. This shaft 19, which is journaled in bearings 20 and 21, carries a multiple sprocket wheel 22 about which pass the multiple chains 23 which pass around a similar multiple sprocket wheel 24 fixed to the spindle drive shaft 25 (see Figure 6), this shaft being arranged to rotate the work spindles as will later more fully appear. This work spindle drive shaft 25 is also arranged to drive the auxiliary spindles for the end working tools as will later be described.

The high speed drive for the cam shaft 6 is derived from the main shaft 14, this shaft having keyed thereto a double sprocket wheel 26 over which passes a double sprocket chain 27 (see Figure 12). This chain also passes about a double sprocket wheel 28 keyed to a shaft 29 beneath and parallel to the shaft 19. This shaft 29, as shown best in Figures 11 and 12, has keyed thereto a bevel pinion 30 which meshes with a bevel gear 31 keyed to a shaft 32. This shaft 32 has journaled thereon a sprocket wheel 33 (Figure 11) which may be clutched to the shaft 32 by means of a disk clutch 34, which is actuated to clutch or unclutch the sprocket wheel 33 to the shaft through a shifting spool 35 actuated by a clutch controller bar 36. When this clutch 34 is closed against the pressure of a spring 34a, the sprocket wheel 33, through a sprocket chain 37 passed thereabout, drives a sprocket wheel 38 keyed to the hub of a bevel gear 39, which, in turn, is keyed to a shaft 40. This bevel gear 39 meshes with a larger gear 41 (see Figure 12), which is pressed onto a sleeve 42, which is loose on the drive shaft 14. The gear 41, as shown, is integral with one portion of a friction clutch, the other portion 43 of which is secured to clutch-actuating bars 44 slidable in slots in a sleeve 45 keyed to the drive shaft 14. The bars 44, when moved to the left as viewed in Figure 12, impinge on clutch-actuating bell crank levers 46 in such a manner as to close the clutch so that the drive shaft 14 is directly connected to the gear 41, which through its meshing bevel pinion 47, drives the cam shaft driving worm shaft 48. This is the normal direction of high speed drive for the shaft 48, the drive through the clutch 34 being a drive in the reverse direction manually controlled by the operator in order to drive the cam shaft in the reverse direction under power when setting up the machine. This clutch 34, which is actuated by the shift rod 36 and is normally held open by the spring 34a, is entirely controlled by hand, as shown, the bar 36 being provided with a spool 50 engaged by the forked extremity 51 of a lever 52. This lever 52 is fulcrumed on a stub shaft 53 and to its upper end is pivoted, as at 54, a control bar 55 which has a handle 56 at its outer end (see Figures 1 and 11) by which the bar 55 may be moved axially.

The normal low speed power drive of the cam shaft 6 is derived from the spindle drive shaft 25 in the following manner. The shaft 25 (Figure 11) carries a sprocket wheel 60 over which passes a chain 61 which passes about a sprocket wheel 62 on a quill 63 (Figure 13) rotatable on a shaft 64. This quill carries two gears 65 and 66 of different sizes, either selected of which may be engaged by gears 67 and 68 on a sleeve 69 slidable axially of but splined to a shaft 70, so that the shaft 70 may be driven at either of two speeds from the quill 63 depending on which of the gears 67 or 68 is in mesh with its driving gear 65 or 66. The shaft 70 carries a pinion 71 which meshes with a gear 72 keyed to the shaft 64, and the shaft 64 and a shaft 73 are connected together by a set of change gears 74 and 75. The shaft 73 has keyed thereto a worm 76 meshing with a worm wheel 77 keyed to a sleeve 78 (Figures 11 and 13). The sleeve 78 is journaled on a bushing 79 on a splined portion of the shaft 48. It is connected through an over-running clutch mechanism comprising the rollers 80 (see Figures 11 and 14) with the shell portion 81 of a clutch sleeve 82 with which may be engaged a mating clutch member 83 slidable on the splined portion of the shaft 48 so as to be non-rotatable relative thereto, but axially movable thereon. This clutch portion 83 may be shifted axially into or out of engagement with the clutch member 82 by means of a shift lever 84 pivoted to a rock shaft 85 (Figures 11 and 33) which carries oppositely disposed fingers 86 engaging a spool 87 carried by the clutch member 83. To the left of the clutch member 83, as viewed in Figure 11, is a collar 88 fixed to the shaft 48 and engaging against the right hand face of this collar is a disk 89. The confronting faces of the disk 89 and the clutch element 83 are formed to define between them an inwardly tapering annular recess within which are positioned a series of balls 90 which also engage in an annular recess 91 on the inner face of the spool 87 so that as the spool is shifted from the central position the balls are wedged inwardly to force the clutch element 83 axially into clutching relation to the mating clutch element 82, thus to couple element 82 into driving relation with the shaft 48. If, therefore, the shaft 48 is not being driven through the high speed power mechanism through the closing of the clutch 43, the worm wheel 77 will drive the worm shaft 48 at either one of two slow working speeds, depending on the position of the change gear collar 69 (Figure 13), but whenever the clutch at 43 is closed, the high speed drive will take charge of the speed of rotation of the shaft 48 which will overrun through the roller clutch mechanism at 81, the drive from the worm wheel 77. This is the situation when the clutch member 83 is held in clutching relation to the member 82. It will be noted that the inner face of the spool 87 elsewhere than at the annular groove 91 is flat, so that the parts are self-locking, there being no tendency for the spool 87 to be shifted away from its closed clutch position when once it has been placed therein.

Means are shown for releasing the clutch element 83 from the clutch element 82 as soon as the wedging pressure of the balls 90 is released. This means comprises the spring pressed plungers 95 carried by the clutch element 83 and which engage the clutch element 82 inwardly of their clutching faces, thus tending to push these clutch members out of engagement whenever permitted to do so by the release of the wedging action of the balls 90.

An interlock is provided between the actuating means for the clutch element 83 and the reverse manually controlled power drive clutch 34. As shown in Figures 32 and 33, this interlock comprises a ball 96 carried in a socket 97 in a portion of the casing 98 which houses the clutch elements 82 and 83, this ball being of a diameter greater than the depth of the socket so that it must project from either one or the other side thereof. On one side it may project into a depression 99 in the bar 55 when the bar 55 is in clutch-open position, and it may also project on the other side into a socket 100 in the rock shaft 85, but only when the rock shaft is in such angular position that the clutch element 83 is out of clutching engagement with its mating element 82. Either one of these actuating means, however, may be moved into clutching condition so long as the other one is out of clutching position, it being evident from Figure 32 that with the ball 96 engaged in the socket 100 of the shaft 85, the bar 55 may be moved axially. Similarly the shaft 85 may be rocked whenever the socket 99 is in the position shown in Figure 32 where the ball may extend thereinto and permit the socket 100 to be turned out of registry therewith.

As shown best on Figure 7, the clutch at 43 is controlled by axial motion of a spool 105 with which engages a yoke 106 guided for rectilinear motion parallel to the shaft 14 through an extension 107 slidably fitting an opening 108 in the machine frame. This yoke 106 is shown as connected through a link 109 with a yoke 110, the branches of which are secured, one to a rock shaft 111 and the other to a short supporting shaft 112. The shaft 111 extends through to the forward face of the machine where it is provided with an actuating handle 114 and intermediate its length it has secured thereto a cam follower arm 115, which carries at its end a retractible cam follower roll 116 which may be actuated under normal operating conditions by cams (not shown) on a cam drum 117 carried by the cam shaft 6. This follower roll 116, as shown, is journalled on a pin 118 carried in a retractible plunger 119. This plunger is normally spring-pressed into the path of the cams on the drum 117 as by a coil spring 120 seated in a socket 121 at the outer end of the arm 115, and a handle 122 pinned to the outer end of this plunger is employed to facilitate retraction of the plunger to bring the cam roller 116 out of the cam path where it may be held by turning the handle 122 to bring a transverse pin 123 out of registry with a slot 124 (see Figure 8) in a cover plate 125 which normally closes off the outer end of the socket 121. The shaft 112 carries at its outer end an actuating arm 130 having a handle 131 at its lower end, this arm 130 carrying a pair of rolls 132 and 133 journaled on a transverse pin 134, which rolls, when the arm 130 is moved to throw out the clutch at 43, pass beneath a double cam 135 (see Figure 4) on one portion 136 of a brake band. This portion 136 is connected through a resilient connection with another portion 137 of the same band so that as the arm 130 carries these rolls 132 and 133 beneath the cam 135, the band 136—137 is tightened about a brake wheel 138 secured to the end of the shaft 40, thus to apply a braking force which immediately slows down the shaft 48 and the cam drum to the low speed determined by the low speed drive through the overrunning clutch from the worm wheel 77 when the clutch 83 is in clutch position, and to entirely stop the rotation of the cam drum should the clutch element 83 be open.

The resilient connection between the brake band sections 136 and 137, as shown in Figure 4, comprises a rod 140 passing through ears 141 and 142 on the brake band sections 137 and 136, respectively, and which passes through a lug 143 projecting from the machine frame. Above this lug there is positioned a coil spring 144, the tension of which may be adjusted by turning a nut 145 on its upper end, a washer 146 being interposed between the nut and the spring. Nuts 147 and 148 serve to adjust the rod 140 relative to the brake band ears 141 and 142. The other end of the brake band section 137 is pivoted to the machine frame as on the stationary pivot pin 148.

The shaft 48 is connected to drive the cam shaft (Figure 11), being provided for this purpose with a worm sleeve 150 which is notched at its left hand end to form projecting portions 151 (see Figure 15) which engage a slabbed off end portion 152 of a portion 153 of the shaft 48 of enlarged diameter. The worm sleeve 150 is held in axial position in engagement with this portion 153 as by means of a sleeve 154 secured thereon as by means of a threaded collar 155 which engages outwardly of a shaft bearing 156, this sleeve having an annular flange 157 inwardly of this shaft bearing. The teeth of the worm 150 engage with mating teeth on a worm wheel 160 which is secured to the cam shaft 6 through any suitable connection, preferably including a shear pin.

The use of a hand controlled power feed in either selected direction for the purpose of aiding in setting up the machine and the interlock between this and the normal power drive is not claimed herein, but is covered generally in my application for patent Serial No. 134,781, filed April 3, 1937, for Multiple spindle automatic lathe.

*Turret mechanism*

The work is carried in rotary spindles mounted in a drum in accordance with usual practice in connection with the cone type of multiple spindle machines. As shown, the drum is indicated at 1160, being housed within the support 4 and carries in circular array about its axis of rotation a plurality of rotary work spindles 161, six such spindles being herein shown. These spindles are rotatable, being driven from the shaft 25 through a gear 162 carried by the shaft 25 and meshing with gears 163, there being one such gear for each of the work spindles. These work spindles have suitable means for gripping the work which extends therethrough and suitable means for feeding the work axially from time to time as is needed. The particular spindle construction is shown in Figure 31, and in general comprises a collet 164 for each spindle adapted to grip the work W, this collet being moved to grip or release the work through a spool mechanism shown generally at 165 and of a type specifically described and forming subject matter of my application Serial No. 129,175 filed March 5, 1937, for Spindle work clamping mechanism. The work is fed from time to time axially of each spindle by reciprocation of a feed tube 166 carrying a socket gripper 167 in accordance with well known practice. Any other suitable type of spindle might be employed, however, in so far as the present invention is concerned.

Spindle drum indexing mechanism

An improved mechanism for indexing the work spindles has been provided, as shown best in Figures 2 and 5. The cam shaft 6 is provided with an indexing arm 170 which in its rotation passes successively into slots 171 in a Geneva wheel 172. This wheel 172 is secured on the hub 173 of an end casting 174 which is keyed to the shaft 175 which is also keyed to the outer end wall 176 of the spindle-carrying drum or turret. It will be noted that the slots 171 are not arranged radially to the wheel or plate 172, but instead are arranged parallel to axis of the wheel and substantially tangent to the path of motion of the cam roller 177 on the indexing arm 170 where it leaves its contact with the indexing plate, this being best shown in Figure 2. Thus as the arm 170 completes its indexing motion, it stops the rotation of the Geneva plate gradually without noise or shock and leaves contact therewith in a tangential direction relative to the slot wall. Thus it is not necessary to rotate the spindle-carrying drum up to a fixed stop which locks the drum in indexed position as in previous constructions, the sole function of the locking bolt being to secure the drum in indexed position, being relieved entirely of the necessity of stopping its rotation. The locking bolt is shown in Figure 6 at 180, being spring pressed into locking position as by the springs 181 in the usual manner and being retracted preparatory to an indexing operation by any suitable cam means such as is common in the art.

Stock control

Certain novel features of this invention are included in the stock control means, more particularly in the stopping of the feed of the stock and in insuring the gripping of the stock after it has been fed and before machining operations are started thereon. The stock stop is shown best in Figures 6 and 16. It comprises a stop arm 200 secured to a rock shaft 201 which is adjustable lengthwise and splined to a shaft 202, this general construction being old and well known. The right hand end portion of the shaft 202, however, has fixed thereto a pinion 203 with which meshes a rack segment 204 on a rocker member 205 fulcrumed at 206. This rocker member has a pair of spaced arms 207 and 208 carrying cam follower rolls 209 and 210 which are positively moved in each direction to bring the stop into and out of operative position by a cam 211 on the inside face of a cam drum 212 carried by the cam shaft 6.

The gripping and releasing of the work as previously stated is effected by axial motion of the spool 165 (Figure 31), there being one such spool for each of the several spindles. Referring to Figures 6 and 28, each spool is engaged by a yoke member 220 which is slidably guided on a stud 221 positioned adjacent to each spindle and which is secured to the end wall 176 of the work holder carrying drum. Adjacent to each pin 221 the corresponding yoke 220 is provided with a fork 222 which in one indexed position engages on opposite sides of an actuating finger 223 on a slide 224 mounted for motion parallel to the axis of the work holders. It is provided on its upper face with a cam follower roll 225 presented in the path of suitable cams on a cam drum 226, also secured to the cam shaft 6. When one of the forks 222 is in engagement with this actuating finger 223, the corresponding spindle is in position for release of the work for a feeding action through the spindle and into contact with the stock stop. It is thereupon closed and the turret is then indexed to the first working position. Means are provided for insuring that the stock is tightly closed at the first tooling station before it passes to the second station, and as shown this is accomplished by interconnection between the opening of the chuck at the cutting off and feeding station to insure closing of the chuck at the next station simultaneously therewith. To this end the slide 224 is provided with a stud at 228 which engages in a slot 229 in a rocker member 230 fulcrumed on a pivot stud 231 secured to the machine frame. This rocker member 230 has its opposite end 233 positioned to engage back of a roller 234 on a sleeve slide member 235 (Figs. 28, 29, and 30) mounted for axial motion on a guide shaft 236 extending parallel to the axis of the work spindle drum. This slide 235 is provided with a lug 237 which rides on a shelf portion 238 projecting from a cover member 239 of the machine frame. This holds the slide 235 against rotation. This slide 235 is provided with a depending bracket 240 which is provided with a finger 242 adapted to be engaged by the fork 222 on the yoke 220 for the spindle next in advance to that engaged by the finger 223, so that the yoke 221, which is engaged by the finger 223, is moved to released position. The finger 242 moves the yoke 220 in the next advanced station to fully closed position, thus insuring the gripping of the work before the machining operations are performed thereon and the positioning of this yoke member 220 so that it may properly engage an arcuate guide rail 245 and a continuation thereof 246 which holds the collets in closed position until they reach the loading position again.

Means are provided, however, for opening the collet at the first tooling position while the collet at the last or feeding station is closed as may be desired for re-setting the stock from time to time, as when a new bar of stock is needed. The machine is then stopped with the work at the last station ready to be cut off but with the collet closed. For this purpose manually operated means are provided for moving the slide 235 in either direction when the collet at the loading station is closed. To this end the bracket 240 of the slide 235 has fixed thereto a short rack bar 250 with which engages pinion teeth cut in a shaft 251, which is journaled in a hub portion 252 projecting outwardly from the cover 239. This shaft 251 is held in proper axial position by a ball 253 riding in an annular groove 254 in this shaft and normally pressed into it by a spring 255 reacting against a plug 256 closing the outer end of the passage within which the spring 255 is positioned. By rotating a hand wheel 257 secured to the outer end of the shaft 251, the bracket 240 and the slide 235 may be moved back to open the collet at the first tooling position, the roller 234 moving away from the end 233 of the rocker 230 so that the collet at the stock feeding position is undisturbed, and then it may be moved back to closed position while the collet at the loading station is closed, in proper position to be advanced to the next station. Should the operator neglect to close the collet at the first tooling position, when the machine is again started, it will be closed automatically by the forward motion of the slide 224 (Figures 6, 28, 29 and 30). The collet at the last station then closes, the machine indexes, and the cycle of operations goes forward.

Side tool slide actuating means

As in other machines of the Cone type, there are a pair of tool-carrying slides which move in from front and back of the machine and carry tools which operate on work carried by spindles which are nearest adjacent thereto. These tool slides are shown at 300 and 301, (Figures 1, 5, 24) and are mounted on suitable slideways in the support member 4. These are actuated through vertical rock shafts 302 and 303, the upper ends of which have secured thereto the arms 304 and 305 which are connected through links 306 and 307 to sliding draw bars 308 and 309 biased in one direction by loading springs 3080 and 3090 to take up lost motion actuated by cams on the cam drums 310 and 311, respectively, these cam drums being carried by the cam shaft 6. The slides themselves are connected to be moved by rocking of the rock shafts 302 and 303 by links such as 315 (Figure 24) connected between adjustable bars 316 to the tool slides and to crank arms 317 secured to the rock shafts. The extent to which these tools may be moved inward toward the turret is separately determined for each indexed position of the turret, in accordance with usual practice, there being a series of adjustable stops such as 320, one for each indexed position, which cooperate with a single stop 321 (see Figure 27) on a vertically slidable bar 322, this bar 322 being moved to present its stop 321 to cooperative relation to the various stops 320 sequentially. The means for so moving this stop 321 in accordance with this invention is designed to operate in a quiet manner. To this end the parts 322 which carry the movable stops 321 are secured (Figure 27) to a crank arm 323 on a rock shaft 324. There are two of these shafts 324 arranged in axial alinement with their adjacent ends connected through a yoke 325 with its central portion 326 offset from the axes of the shafts 324 to form a crank arm so that as this arm is raised or lowered, the shafts 324 are rocked, thus to raise or lower the bars 322 carrying the movable stops 321. The spindle-carrying turret is bridged across between the spindles by connection members 328 which are shown as integral with the end walls of the spindle-carrying drum, and each of these bridging members 328 is provided with a depression in its outer face within which is adjustably secured a screw 329. These screws are independently adjustable for each of the work spindles and they are presented serially beneath the portion 326 of the yoke 325, the distance to which they project from their supporting members determining the resultant angular position of the rock shafts 324, and consequently the positions of the stops 321 with relation to the stops 320. These screws 329 are adjusted so that each one corresponds with a position of each movable stop 321 opposite to one of the adjustable stops 320 so that when the work-holding drum has been indexed through a complete revolution the stops 321 have been brought opposite each one of the stops 320, each stop 320 corresponding to one indexing angular motion of this spindle-carrying drum. In order that the angular positions of the shafts 324 may be changed from one to a succeeding operative position of the stops 321 in a smooth and noiseless manner, the portion 326 has fixed to its lower face a leaf spring 330 having its ends outwardly turned as at 331 so that each of the screw heads 329 as it comes toward its controlling position passes beneath one end of the spring 330 and somewhat gradually moves the portion 326 of the yoke to its operative position with the stop screw 329 directly thereunder, as shown in Figure 27. Similarly the trailing end of the spring at 331 allows the screws 329 to pass out from beneath it with an easy motion. At least one stop screw is in engagement with the spring 330 at all times.

Besides these front and back slides which move in and out horizontally, the machine shown is provided with a pair of tool slides 350, which are movable inwardly and downwardly and outwardly and upwardly. As shown best in Figures 25 and 26, each of these slides comprises a box-shaped member 351 enclosing and slidably engaging the side faces of a guide member 352. Gibs 353 (Figure 26) having inclined faces 354 engaging matingly inclined faces on the guide block 352 retain the slide 350 in position thereon. The guide block 352 is secured for angular adjustment to an undercut face on the frame member 5 and to this end the guide 352 has an arcuate extension 355 having a marginal flange 356 underlying a retaining flange ring 357 secured as by screws 358 to the frame member 5. The frame member 5 and the guide member 352 (Figure 24) are provided with oppositely disposed openings in which are held opposite ends of a shaft 359. Mounted on this shaft are the roller bearings 360 (Figures 24 and 26), the outer edge members of which are pressed into a sleeve or hollow shaft 361. This sleeve 361 has a pair of spaced gear portions 362 and 363 thereon. The gear portion 362 meshes with a rack bar 364 which is secured to the draw bar 365 provided with a cam roller 366. One of these cam rollers 366 engages cams on a drum 367, and the other with cams on a drum 368 which are secured end to end to the cam shaft 6 (Figure 5). The gear portions 363 engage with rack teeth in a cylindrical bar 370 which is retained between an integral end wall member 371 for the slide 350 and a cover 372 bridging the opposite end thereof, so that as the sleeve 361 is rotated the corresponding tool slide is moved along its guide 352. A tapering gib 373 (Figure 25) is positioned between one face of the member 351 and the guide block 352, and it may be adjusted to take up wear by manipulation of screws 374 which are threaded into the guide block 352 and engage adjusting bars 375, the opposite ends of which are slotted to take over guide pins 376 and are rounded to find rocking bearing on the outer faces of the guide block 352. Each slide 350 is normally held upwardly in retracted position by means of a coil spring 377, which surrounds its rack bar 370 and reacts between a cover member 372 and an annular shoulder 380 on a bushing 381 within which the rack bar 370 is positioned and which is shouldered as at 382 to engage a mating shoulder on the bore 383 of the guide block 352 within which it is positioned. An adjustable stop screw 384 is shown as set into the cover 372 to limit the downward motion of each tool slide. The lower end of the tool slide is provided with a transverse T slot as at 385 to receive a suitable tool holder which may be secured therein, as by T bolts, in the well known manner.

Between the tool slides 350 there is mounted a third tool slide 390 (Figures 6, 20 and 24) which is secured as by bolts 391 to a slide block 392 mounted in a slideway 393 in the underside face of the frame portion gibs 395 being inserted between the sides of the block 392 and the guideway 393. The lower face of the tool slide 390 is formed arcuate and a pair of T slots 396 are formed therein for the reception of suitable tool holders (not shown). The slide 390 is provided with a central opening 397 through which passes the stock stop shaft 201. The slide is moved axially and for this purpose the member 392 is provided with a cam follower 398 (Figure 6) which projects up through a slot 399 through the frame member 5. This follower roll is actuated by suitable cams (not shown) on the cam drum 400, also secured to the cam shaft 6.

Beside the tools carried by these slides, various end working tools may also be provided. Three types of such end working tool mechanism are shown herein, one being for tapping and two for drilling.

As shown in Figure 6, the shaft 25 passes through a tube 420, which is secured at one end to the turret wall 1160 and is journaled at its opposite end in a bushing 421 in the column 2. Journaled on a pair of bushings 422 and 423, spaced apart along the tube 420, is a tubular slide 424 provided with longitudinally extending T slots 425 arranged about its periphery. Certain of these T slots may take tool holders slidable therealong and certain tool holders may be secured therein for actuation by axial sliding of the tubular slide 424. This tubular member is given its axial sliding motions by cams on a drum 212 which act upon a cam follower roll 426 on a post 427, which, at its upper end, is slidable on a guideway on the lower face of the upper frame member 5. At its lower end this post 427 engages over the end portion of the slide 424 and is suitably secured thereto. The extent of motion of this slide toward the work spindles may be limited by an adjustable stop 428 which may extend through an opening through the post 427, its rear end being secured to the inner wall of the column 2. The driving mechanism for the end working tools is positioned within a chamber 430 in the column 2 and is readily accessible through an opening normally closed by a removable cover 431. This cover is arranged laterally of the shaft 25 and the shafts for the various end working tools and adjacent to the ends thereof.

*Tapping attachment.*—This tapping attachment is shown best in Figures 9, 9a, 9b, 22 and 23. In Figure 9 the parts are shown as the tap is about to enter the work. This tap shown at 450 is carried in a rotary holder 451 which is splined so as to be slidable and non-rotatably engaged in a bushing 452 secured in the adjacent hollow end of a shaft 453 which houses the rear end portion of the carrier 451. The opposite end of the shaft 453 is reduced to a splined shank portion 454 which is slidable and non-rotatable through a bushing 455 secured to the outer end portion of a tube 456. This tube is provided with openings within which balls 457 are positioned and to the right of these balls the tube 456 is provided with an outwardly directed flange 458 which is screwed to the flanged end of a hollow shaft 459. Adjacent to the head of the hollow shaft 459 it is journaled in the inner wall of the column 2. The opposite end portion of the hollow shaft 459 is provided with a series of reduced diameter portions on which are mounted various clutches and gears which will now be described. At the left hand portion a gear 460 is journaled on a sleeve 461 between a brake disk 462 fixed to the hollow shaft 459 and a brake disk 463 axially slidable on the bushing 461, so that by passing the brake disk 463 to the left, the gear 460 is clamped between the brake disks 462 and 463 and is clutched to rotate the shaft 459. To the right of the clutch disk 463 there is keyed to the shaft 459 a sleeve 465 which has an integral disk-shaped portion 466 tapered toward its outer extremity for the reception between it and an outwardly tapered portion 467 on the clutch disk 463 of a series of balls 468, so that as these balls are wedged inwardly, the clutch disk 463 is pressed to the left to clutch the gear 460 into driving relation to the shaft 459. Between the opposite face of the disk 466 and a clutch disk 470 loose on the sleeve 465, is another series of balls 471, which, when crowded toward the axis of the shaft 459, force the clutch disk 470 into clutching engagement with a small gear 475 and a clutch disk 476 pressed onto the sleeve 465, thus to clutch the gear 475 into driving relation to the shaft 459. These gears and clutch collars are held in position as by a nut 478 threaded on the sleeve 465 and a nut 479 threaded on the extremity of the shaft 459. The two series of clutch balls are forced inwardly toward the axis of the shaft 459 to clutch their respective clutch disks, or to release the same, by means of an axially movable collar 480 surrounding the series of balls and having end portions of smaller diameter separated by a portion of enlarged internal diameter so arranged that as one end portion passes into engagement with the balls of one series, the opposite end portion passes out of engagement with the other series of balls, thus releasing them so that they may be thrown outwardly by centrifugal force and release their respective clutch elements. This axial motion of the clutch-controlling sleeve is produced by axial motion of a shifting plunger or rod 485, which extends through the hollow shaft 459, and terminates inwardly in a head 486. This head is provided with an annular groove at 487 within which the balls 457 may be pressed, as by the small diameter portion 488 of a latch collar 489 which is slidable axially of the sleeve 456. This collar 489 is provided with an internal groove 490, which, when the collar 489 is in suitable axial position, comes opposite to the balls 457 and permits them to pass outwardly thereinto, freeing them from the head 486, which is then permitted axial motion. A spring 495 surrounding the rod 485 and reacting between the head 486 and an abutment disk 496 bridging across the hollow shaft 459 tends to force the rod 485 to the left into the position shown in Figure 9a, which causes the clutch-actuating collar 480 to be moved from the position shown in Figure 9 to that shown in Figure 9a, unclutching the larger gear 460 from driving relation to the shaft 459 and clutching the smaller gear 475 thereto. The gear 460 is in continuous driven relation to a relatively small gear 498 keyed to the spindle drive shaft 25 and the small gear 475 is in continuous engagement with a relatively larger gear 499, also keyed to the shaft 25, so that when the gear 460 is in driving relation to the shaft 459, it is driven at a relatively low speed less than that of the work spindles, and when the gear 475 is in clutched relation to the shaft 459 it is driven at a higher speed higher than that of the work spindles.

The tap holder 451 is given a forward feed motion to start the engagement of the tap 450 in a hole in the work, and this is done by moving to the left a yoke member 500 which engages an annular groove 501 in the tap holder and which has pivoted thereto on a pin 502 (see Figure 22) a thrust rod 503. This thrust rod has a sleeve 504 slidable thereon and retained between a pair of springs 505 and 506 which engage remote from the ends of the sleeve 504 adjustable nuts 507 and 508 threaded onto the rod 503. This sleeve 504 is pivoted within a slot 515 in an actuating arm 516 (see Figures 1, 6, and 20) fulcrumed on the fixed shaft 517. This arm 516 has an upward extension 518 provided with a cam follower roll 519 for actuation by cams (not shown) on a cam drum 520 fixed to the cam shaft 6. In operation, the arm 516 is swung by the cam to bring the tap 450 into contact with the work, and as soon as engagement between the tap and the work has been effected, continued rotation of the work relative to the tap, the tap then being driven at a relatively low speed through the gears 498 and 460 in the same or opposite direction as the work, depending on whether the tap is right or left handed, causes the tap and its holder 451 to be fed forward relative to the sleeve 453. This causes the holder 500 to be drawn along with the tap until it contacts with a nut 521 (see Figures 9 and 9a) on the end of a pull rod 522. This pull rod is connected through a turnbuckle 523 with a block 524 having a yoke 525 engaging the spool 489, so that after the nut 521 is contacted and moved slightly to the left into the position shown in Figure 9a, the latch balls 457 are released, permitting the spring 495 to press the rod 485 to the left, unclutching the low speed gear 460 and clutching the high speed gear 475. This causes the speed of rotation of the tap to be increased above that of the work, thus producing a relative reversal of rotation between the tap and the work which withdraws the tap from the work. The rod 522 is pressed rearwardly as by the spring 526 reacting between a collar 522a thereon and the slide 527 which supports the forward end of the sleeve 453 rigidly to the slide 424, but this spring is unable to return the block 524 immediately to its right hand position for the reason that the balls 457 at this time engage the full diameter portion of the head 486 of the rod 485. As soon, however, as the bar 454 has been retracted sufficiently by movement imparted to the slide 424 to press the head 486 to the right sufficiently to bring the annular groove 486 into alinement with the balls 457, these balls release the collar 489, which is then moved back to its position shown in Figure 9, locking the rod 485 in its low speed position to which it has been moved by the retraction of the slide 424. The tap is then rotating at its low speed ready to be presented to the next piece of work which is brought opposite thereto by the indexing of the work-carrying drum.

Means may be provided for adjusting the effective length of the reverse bar 485. This is shown in Figure 9b and to a larger scale in Figure 10. The collar 480 is provided with an annular external groove within which rides a yoke 530 forming part of a sleeve 531 slidably mounted on a guide bar 532. This sleeve 531 has an extension 533 having a counterbored portion 534 overlaid by a cover disk 535 which is secured to the portion 533 as by screws 536. This construction provides a recess at 537 within which is positioned the head 538 of a coupling 539. This has threaded connection with a reduced diameter portion 540 of the rod 485. These parts may be fixed in adjusted position by means of a threaded locking plug 541, which may be threaded into the outer end of the coupling 539 and jammed against the end of the bar 485. A socket 542 for the reception of a tool entered through a hole 543 in the cover disk 535 may be provided to facilitate the loosening or tightening of this locking plug to fix the parts in adjusted position.

Drilling attachment

The motion of the slide 424 may also be utilized to present and retract a drill to the work at a different station from that where threading is effected. Such a mechanism is shown, also, in Figure 9. Referring to this figure, a bearing block 550 is secured as by the clamping bolts 551 to the slide 424. This contains the antifriction bearings 552 which rotatably support a drill shaft 553, which may be provided with a socket 554 to receive the shank of a drill. This shaft 553 is shown as splined at 555 and passes through a correspondingly shaped opening in a plug 556 suitably secured in the forward end of a sleeve 557 journaled as at 558 in the inner wall of the column 2. This sleeve 557 permits the shaft 553 to be retracted thereinto, or to be extended therefrom, but insures that rotation imparted to the sleeve 557 will be imparted to the drill shaft 553. This sleeve 557 is also journaled in a bearing 559 in an intermediate partition 560 within the column 2, and rearwardly of this bearing it has keyed thereto a gear ring 561 with which meshes a gear 562 on an intermediate shaft 563. This intermediate shaft also carries fixed to rotate with the gear 562, a gear 564, which meshes with a gear 565 fixed to the shaft 25 between the gear 498 and 499.

Modified drilling attachment

It is also possible to employ the slide 424 to merely support a drill or other rotary tool which is slidable relative to the support 424. For example, a high speed drill may be so mounted, and such a construction is shown in Figures 1, 7, 20 and 21. In this construction a bearing block 575 is fixed on the slide 424 in one of its longitudinal grooves, and slidable within the block 575 is a sleeve 576. Within this sleeve is rotatably mounted a drill shaft 577 which has a socket 578 at its outer end to receive the shank of the drill or drill holder. This sleeve 576 at its right hand end portion carries a thrust bearing 579 provided with a U shaped extension 580 which engages about a guide strip 581, also clamped in the slot of the slide 424 which carries the block 575. The drill shaft 577 extends through the bearing 579 and is splined rearwardly thereof as at 585 and extends back into the column 2 where it may be mounted identical with the rear end of the sleeve 557, and be driven through an intermediate shaft 586 (see Figure 7) from the gear 565, the shaft 586 carrying the two gears 587 and 588, the gear 587 meshing with the driving gear 565, and the gear 588 meshing with a gear 589 in driving relation to the splined portion 585 of the drill shaft 577. The axial motion of the drill shaft 578 is controlled from a cam on the cam shaft 6, this control being derived through a lever 590 (Figure 20) carrying a cam follower roll 591 at its upper end actuated by suitable cams on the cam drum 592. The lower end of the lever 590 is connected through a link 593 adjustably connected to a pivot pin 594 rockably supported in an extension 595 from the bearing 579.

Cycle indicator

Means are provided in accordance with this invention for indicating to the operator at all times the particular portion or phase of the cycle in which the machine is positioned and operating at any time during its operation. It will be noted that the machine is largely enclosed by the framing portions, and the cam mechanism is normally enclosed by guard or cover members shown at 600. Likewise, in commercial practice guard members (not shown herein) are applied to the front and back of the machine, so that the operative mechanism is almost entirely concealed during the operation of the machine. It is convenient to the operator to be able to tell at a glance just what part of the repetitive cycle is being carried out by the machine at any particular time, and the cycle-indicating mechanism has therefore been developed to that end.

This mechanism is shown in Figures 1, 5, 16 and 19, inclusive. The cam shaft 6 has fixed thereto a cycle cam comprising a rim member 605 which may be applied to any convenient cam drum and herein shown as applied to the cam drum 212. This has an end face contoured in accordance with the various portions of the cycle of the machine being provided with a shoulder and a rise from the foot of the shoulder to its top, and in engagement therewith is a follower roll 606 pivoted to one arm of a bell crank lever 607 which is fulcrumed on a fulcrum pin 608 pivotally supported in a bracket plate 610. The opposite end of the arm 607 is connected through an adjustable link 611 pivoted at 612 to the lever 607, and pivoted to an arm 613 carried by a rock shaft 614. This rock shaft 614 extends through the forward face of the frame member 5 and carries an indicator pointer 615 (Figures 17 and 19) which coacts with a scale 620 having indicated thereon the various portions of the cycle of operations. The cam 605 is so shaped as to cause the pointer 615 to be traversed through an arc represented by the scale 620 in one complete rotation of the cam shaft 6, and thus one complete cycle of operations of the machine, and then to permit the follower roll 606 to drop back quickly to its starting position as the cam roller passes over the cam shoulder, returning the pointer 615 to its initial position. In order to avoid shock the starting position of the pointer is determined by the engagement of an adjustable stop screw 622 on a stop lug 623 projecting from the supporting plate bracket 610. Thus it is possible for the operator to determine at any particular instant by the position of the pointer relative to the scale, the position of the machine with relation to its cycle of operations.

From the foregoing description of certain embodiments of this invention, it should be evident to those skilled in the art that various changes and modifications may be made without departing from its spirit or scope as defined by the appended claims.

I claim:

1. In a machine of the class described, a machine frame comprising a bed, a hollow column extending from one end of said bed and having a chamber therein provided with a removable cover, a rotatable drum supported above said bed spaced from said column, a plurality of rotary work spindles arranged in circular series about the axis of said drum, a drive shaft for said work spindles arranged in the axis of said drum and projecting into said chamber, means for rotating said shaft, end tool mechanism for acting on work carried by certain of said spindles and including a rotary shaft extending into said chamber, and driving connections between said shafts located in said chamber, said cover extending laterally of said shafts and adjacent to the ends thereof, whereby said connections are freely accessible to the operator when said cover is removed.

2. The combination, in a machine having a plurality of operative mechanism and means determining a repetitive cycle of operations of said mechanisms, of a member responsive to changes in said cycle, and means controlled by said member indicating to the operator the particular phase of the cycle at which the machine is operating at any instant.

3. The combination, in a machine having a plurality of operating mechanisms and means determining a repetitive cycle of operations of said mechanisms, of a cam driven in time with said mechanisms and completing its cycle with the cycle of operations of said mechanisms, and means controlled by said cam for indicating to the operator the particular phase of the machine cycle of the machine at any instant.

4. A metal working machine having tools, work manipulating means, tool actuating means, and means for automatically actuating said manipulating and actuating means to perform repetitive cyclic tooling operations on the work, a rotatable cam, means for rotating said cam once during each complete cycle of operations of the machine, and an indicator controlled continuously by said cam to show to the operator at any instant the part of the cycle at which the machine is then operating.

5. A metal working machine having tools, work manipulating means, tool actuating means, and means for automatically actuating said manipulating and actuating means to perform repetitive cyclic tooling operations on the work, a rotatable cam having a shoulder and a gradual rise from the foot to the top of said shoulder, means for rotating said cam once during each complete cycle of operations of the machine, a follower riding on said cam and engaging at the foot of said shoulder at the start of each cycle, and an indicator actuated by the motion of said follower and showing at any instant the phase of the cycle at which the machine is then operating.

6. The combination with a hollow work spindle, means for gripping and releasing work in said spindle, and means for feeding work through said spindle when the work is released, of a stock stop movable from and to a position in alinement with the stock in said spindle and against which the stock impinges when fed, an arm carrying said stop, a rock shaft supporting said arm, a pinion on said rock shaft, a rack segment engaging said pinion and pivotally mounted, a rotary cam, arms carried by said segment and bearing on opposite faces of said cam for controlling the rocking of said segment in opposite directions, and means for driving said cam.

7. In combination, a guide block, a slide enclosing said block and having side members guided by sides of said block and end members normally spaced from the ends of said block, a longitudinally tapered gib between one side of said block and the adjacent side of said slide and adjustably carried by said block, and means accessible from outside of said slide for adjusting said gib lengthwise relative to said block.

8. In combination, a guide block, a slide enclosing said block and having side members guided by sides of said block and end members normally spaced from the ends of said block, a longitudinally tapered gib between one side of said block and the adjacent side of said slide, and screw means for adjusting said gib lengthwise relative to said block, at least one of said slide ends having an opening through which access may be had to said screw means.

9. In combination, a guide block, a slide enclosing said block and having side members guided by sides of said block, a longitudinal tapered gib between one side of said block and the adjacent side of said slide, bars pivotally mounted on the ends of said block and engaging the opposite ends of said gib, and screws threaded into said block ends and engaging said bars for adjusting said gib lengthwise relative to said block.

10. In a machine of the class described, a guide block, a tool carrier mounted for sliding motion on said block, a bar extending slidably through said block and secured to said carrier, a spring surrounding said bar and bearing between said block and carrier to bias said carrier in one direction, said carrier enclosing said bar and spring and said guide block and means carried by said block and engaging said bar actuable to move said carrier in opposition to said spring.

11. In a machine of the class described, a spindle-carrying drum, means supporting said drum for rotation about its axis, a Geneva plate secured to rotate with said drum and having Geneva slots therein, and a rotary arm having a follower for engagement in said slots to index said drum, said slots being disposed at angles to the radii of said Geneva wheel such that each is substantially tangential to the path of rotation of said follower when said follower is moving out therefrom.

12. The combination with a machine of the class described, having a spindle-carrying drum, means supporting said drum for rotation about its axis, a frame member located above said drum, carriers movable beneath said frame member from and toward said spindles, a cam shaft rotatably carried by said frame member, cams on said shaft for moving and controlling said carriers, and a Geneva plate fixed to rotate with said drum and having Geneva slots therein, of a crank arm carried by said shaft and having a follower engageable in said slots, said slots being arranged at an angle to the radii of said Geneva plate such that each is in position substantially tangential to the path of rotation of said follower as said follower is leaving engagement therewith, and means for rotating said shaft.

13. In combination, a rotary drum, a plurality of rotary work spindles arranged in circular array about the axis of rotation of said drum, a tool carrier mounted to move toward and from said work spindles, means for indexing said drum to bring said spindles in succession opposite to said tool carrier, independently adjustable fixed stops, there being one such stop for each indexed position of said drum, a stop movable to cooperate successively with said fixed stops to limit the extent of motion of said tool carrier toward said spindles, an element carried by said drum for each indexed position of said drum, and means actuated by said elements as said drum is indexed to move said movable stop into successive cooperating relation to said fixed stops, said means including a spring extending circumferentially of said drum and with which at least one of said elements engages at all times for moving said movable stop.

14. In combination, a rotary drum, a plurality of rotary work spindles arranged in circular array about the axis of rotation of said drum, a tool carrier mounted to move toward and from said work spindles, means for indexing said drum to bring said spindles in succession opposite to said tool carrier, independently adjustable fixed stops, there being one such stop for each indexed position of said drum, a rock shaft having a pair of spaced rock arms, a member connected to one of said arms, a stop carried by said member for cooperation with said fixed stops and moving into cooperation with the various fixed stops by rocking of said arm to limit the extent of motion of said tool carrier toward said spindles, an element for each of said work spindles projecting from the periphery of said drum, said elements being angularly spaced in accordance with said spindles and projecting to different distances therefrom, and a spring carried by the other of said arms and arranged to contact at least one of said elements at all times in position to cause the angular position of said rock shaft to be determined at each indexed position by the amount of projection of one of said elements and to be moved yieldingly from one to another angular position during the indexing movement of said drum.

15. A machine of the class described, comprising a work spindle, a tool slide, means for relatively moving said spindle and slide comprising a bar mounted for axial sliding motion, operative connections between said bar and slide, a cam follower carried by said slide, cams for actuating said follower, and spring means acting on said slide and outside of said connections for taking up lost motion in said moving means.

16. A machine of the class described, comprising a spindle-carrying drum mounted for indexing motion, a plurality of work spindles carried by said drum in circular array about its indexing axis, means carried by each spindle to grip work, means acting to release each gripping means when the corresponding spindle is at one indexing station, and operative connections from said gripping means at said one station to the gripping means at another station simultaneous to insure the gripping action of the gripping means of the spindle at said other station when said first gripping means is released.

17. A machine of the class described comprising a spindle-carrying drum mounted for indexing motion, a plurality of work spindles carried by said drum in circular array about its indexing axis, means carried by each spindle to grip work, there being a work loading station and a plurality of tooling stations for said drum, means acting to release each gripping means when the corresponding spindle is at the loading station, and operative connections from said gripping means at said loading station to the gripping means at the first tooling station to insure the gripping action of the gripping means at said first tooling station when the gripping means at said loading station is released.

18. A machine of the class described comprising a spindle-carrying drum mounted for indexing motion, a plurality of work spindles carried by said drum in circular array about its indexing axis, means carried by each spindle to grip work, there being a work loading station and a plurality of tooling stations for said drum, means acting to release each gripping means when the corresponding spindle is at the loading station, operative connections from said gripping means at said loading station to the gripping means at the first tooling station to insure the gripping action of the gripping means at said first tooling station when the gripping means at said loading station is released, and means actuable to open the gripping means at said first tooling station while the gripping means at the loading station is closed.

19. A machine of the class described, comprising an indexing spindle-carrying drum, a plurality of work spindles carried by said drum in circular array about its indexing axis, work-gripping means for each spindle, means movable axially of each spindle to open and close its gripping means, means engageable with said axially movable means of each spindle at one indexed station thereof, means moving said engageable means in work-releasing direction at said station, and operative connections from said moving means for moving said moving means at another station to work-gripping position as it moves said engageable means to release the work at said one station.

20. A machine of the class described, comprising an indexing spindle-carrying drum, a plurality of work spindles carried by said drum in circular array about its indexing axis, work-gripping means for each spindle, means movable axially of each spindle to open and close its gripping means, means engageable with said axially movable means of each spindle at one indexed station thereof, means moving said engageable means in work-releasing direction at said station, operative connections from said moving means for moving said moving means at another station to work-gripping position as it moves said engageable means to release the work at said one station, and means actuable to open or close the gripper at said other station when the gripping means at said one station is closed.

21. A machine of the class described, comprising an indexing spindle-carrying drum, a plurality of work spindles carried by said drum in circular array about its indexing axis, work-gripping means for each spindle, means including an actuating spool movable axially of each spindle for actuating the gripping means to grip or release work carried by its respective spindle, means at two adjacent stations with which the spools of the spindles at said station engage, interconnections between said engaged means for moving them simultaneously in opposite directions to thereby release work at one of said stations and grip work at the other of said stations, and means for moving one of said engaged members.

22. A machine of the class described, comprising an indexing spindle-carrying drum, a plurality of work spindles carried by said drum in circular array about its indexing axis, work-gripping means for each spindle, means including an actuating spool movable axially of each spindle for actuating the gripping means to grip or release work carried by its respective spindle, means at two adjacent stations with which the spools of the spindles at said stations engage, interconnections between said engaged means for moving them simultaneously in opposite directions to thereby release work at one of said stations and grip work at the other of said stations, means for moving one of said engaged members, and means actuable at times to move the other of said engaged members independently of said one engaged member.

23. A machine of the class described having a bed, spaced frame members upstanding from said bed, a top frame member connecting said spaced frame members above said bed, work carriers positioned between said top frame member and bed, tool holders carried by said top frame member inclined inwardly and downwardly for supporting tools for operating on work carried by certain of said carriers, a tool holder supported on the lower face of said top frame member, a cam shaft supported by said top member, means actuated by cams on said shaft for moving said tool holders, means for driving said shaft, a stop for determining the position of work in certain of said carriers, and a rock shaft supporting said stop and extending slidably through said tool holder supported on the lower face of said frame member.

24. A threading attachment for a machine tool having a rotary work spindle and a drive shaft for said spindle, said attachment comprising a rotary and axially movable threading tool holder, a rotary hollow shaft to which said holder is non-rotatably and slidably secured, a two-speed drive, one speed greater than and the other less than the rate of rotation of said spindle for said hollow shaft from said drive shaft, clutches for selective coupling of either speed drive, a rod slidable through said hollow shaft for controlling said clutches, means biasing said rod to one of its speed-selecting positions when the relative directions of rotation of said work spindle and tool are such as to feed the tool from the work, a sleeve slidable on said hollow shaft, operative connections between said sleeve and rod for latching said rod in the other of its speed-selecting positions in one axial position of said sleeve and releasing said rod in another axial position of said sleeve, operating connections between said sleeve and holder for moving said sleeve to rod-releasing position when said head has been drawn by engagement of its tool on the work to the desired extent, means actuable to move said holder toward work carried by said spindle to present the tool thereto when said rod is in latched position and to retract said holder after said tool has been freed from the work, and means actuated by such retraction to re-set said rod and sleeve in latched condition.

CARROLL E. MILLER.